(12) United States Patent
Lee et al.

(10) Patent No.: US 9,881,562 B2
(45) Date of Patent: Jan. 30, 2018

(54) DISPLAY APPARATUS

(71) Applicant: Samsung Display Co., LTD., Yongin, Gyeonggi-Do (KR)

(72) Inventors: Moongyu Lee, Suwon-si (KR); Taewoo Kim, Seoul (KR); Hyeonggyu Jang, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 141 days.

(21) Appl. No.: 14/821,757

(22) Filed: Aug. 9, 2015

(65) Prior Publication Data

US 2016/0217750 A1 Jul. 28, 2016

(30) Foreign Application Priority Data

Jan. 23, 2015 (KR) .................. 10-2015-0011518

(51) Int. Cl.
*G09G 3/36* (2006.01)
*G09G 3/34* (2006.01)
(Continued)

(52) U.S. Cl.
CPC ........... *G09G 3/3406* (2013.01); *G02F 1/133* (2013.01); *G02F 1/133606* (2013.01);
(Continued)

(58) Field of Classification Search
CPC .......... G09G 3/3406; G09G 2320/0626; G02F 1/133; G02F 1/133606; G02F 2001/13312;
(Continued)

(56) References Cited

U.S. PATENT DOCUMENTS

| | | | |
|---|---|---|---|
| 5,990,976 A | 11/1999 | Higashida | |
| 6,175,399 B1 * | 1/2001 | Mitsui | ................. C09K 19/544 349/113 |

(Continued)

FOREIGN PATENT DOCUMENTS

| | | |
|---|---|---|
| JP | 2011158574 A | 8/2011 |
| KR | 1020020000506 A | 1/2002 |

(Continued)

OTHER PUBLICATIONS

Extended European Search Report for Application No. 15196663.7-1904 dated Jun. 30, 2016.

*Primary Examiner* — Adam R Giesy
*Assistant Examiner* — Chineyere Wills-Burns
(74) *Attorney, Agent, or Firm* — Cantor Colburn LLP

(57) ABSTRACT

A display apparatus includes a display panel including a first polarizing plate having a first polarizing axis substantially parallel to a first direction, a backlight unit which generates a light, a diffusion plate interposed between the first polarizing plate and the backlight unit, the diffusion plate includes an anisotropic area having a transmission axis substantially parallel to the first direction and a diffusion axis substantially perpendicular to a second direction, where the second direction is substantially perpendicular to the first direction, and a photographic unit interposed between the anisotropic area and the backlight unit, where the photographic unit captures an image of an object transmitted to the photographic unit through the display panel.

25 Claims, 14 Drawing Sheets

(51) Int. Cl.
  *G06F 3/00* (2006.01)
  *G06F 3/01* (2006.01)
  *G02F 1/133* (2006.01)
  *G02F 1/1335* (2006.01)
  *H04N 7/14* (2006.01)
(52) U.S. Cl.
  CPC .............. *G06F 3/005* (2013.01); *G06F 3/013* (2013.01); *H04N 7/144* (2013.01); *G02F 2001/13312* (2013.01); *G09G 2320/0626* (2013.01); *H04N 2007/145* (2013.01)
(58) Field of Classification Search
  CPC .. H04N 7/144; H04N 2007/145; G06F 3/013; G06F 3/005
  USPC ......................................................... 345/102
  See application file for complete search history.

(56) References Cited

U.S. PATENT DOCUMENTS

| | | | |
|---|---|---|---|
| 6,798,457 B2 | 9/2004 | Boyden et al. | |
| 8,817,176 B2 | 8/2014 | Yu | |
| 2004/0017529 A1* | 1/2004 | Choi | G02B 5/3083 349/114 |
| 2005/0018106 A1* | 1/2005 | Wang | G02F 1/133502 349/96 |
| 2005/0041410 A1 | 2/2005 | Yamashita et al. | |
| 2007/0120879 A1* | 5/2007 | Kanade | H04N 7/144 346/107.2 |
| 2008/0049170 A1* | 2/2008 | Hwang | G09G 3/3406 349/69 |
| 2009/0009687 A1* | 1/2009 | Park | G02B 5/0215 349/64 |
| 2009/0027594 A1* | 1/2009 | Yun | G02F 1/133514 349/64 |
| 2009/0027600 A1* | 1/2009 | Hisatake | G02F 1/133536 349/98 |
| 2009/0102763 A1* | 4/2009 | Border | H04N 7/144 345/87 |
| 2012/0257004 A1 | 10/2012 | Smith et al. | |
| 2013/0321686 A1 | 12/2013 | Tan et al. | |
| 2014/0111420 A1* | 4/2014 | Ahn | G06F 3/167 345/156 |
| 2015/0226542 A1* | 8/2015 | Sakashita | G01L 1/24 356/33 |

FOREIGN PATENT DOCUMENTS

| | | |
|---|---|---|
| KR | 1020050034719 A | 4/2005 |
| KR | 1020120071963 A | 7/2012 |
| KR | 1020120073763 A | 7/2012 |
| KR | 1020130083153 A | 7/2013 |
| WO | 2007047685 A2 | 4/2007 |

* cited by examiner

<Display Period>

DISPLAY APPARATUS

This patent application claims priority to Korean Patent Application No. 10-2015-0011518, filed on Jan. 23, 2015, and all the benefits accruing therefrom under 35 U.S.C. §119, the contents of which in their entirety are herein incorporated by reference.

BACKGROUND

1. Field

The invention relates to a display apparatus. More particularly, the invention relates to a display apparatus having an eye-to-eye communication function.

2. Description of the Related Art

Among types of flat panel display devices, a liquid crystal display device is widely employed in electronic devices, such as a television set, a monitor, a notebook computer, a mobile phone, etc., to display an image.

The liquid crystal display device includes a liquid crystal display panel which displays the image and a backlight unit which supplies light to the liquid crystal display panel. The liquid crystal display panel controls the intensity of an electric field applied to liquid crystals interposed between two substrates and adjusts the amount of light passing through the two substrates, thereby displaying a desired image.

The liquid crystal display device may further include a photographic unit which captures a picture of an external image. In general, the photographic unit does not overlap with a display part of the liquid crystal display panel.

SUMMARY

The invention provides a display apparatus having an eye-to-eye communication function.

Exemplary embodiments of the invention provide a display apparatus including a display panel which includes a first polarizing plate having a first polarizing axis substantially parallel to a first direction, a backlight unit which generates a light, a diffusion plate interposed between the first polarizing plate and the backlight unit, the diffusion plate includes an anisotropic area having a transmission axis substantially parallel to the first direction and a diffusion axis substantially parallel to a second direction, where the second direction is substantially perpendicular to the first direction, and a photographic unit interposed between the anisotropic area and the backlight unit, where the photographic unit captures an image of an object transmitted to the photographic unit through the display panel.

The first polarizing plate polarizes the image of the object in a direction substantially parallel to the transmission axis to transmit image light polarized in the direction substantially parallel to the transmission axis, and the diffusion plate receives and transmits the image of the object polarized by the first polarizing plate, provides the photographic unit with the transmitted polarized image of the object, diffuses a light polarized in a direction substantially parallel to the diffusion axis among the light provided from the backlight unit, and provides the display panel with the diffused light polarized in the direction substantially parallel to the diffusion axis.

The display panel further includes a non-display part, and a display part which displays an image, the display part corresponding to a display area of the display panel, and the photographic unit is disposed to correspond to the display area of the display panel.

In the anisotropic area, the diffusion plate includes a base and a plurality of first diffusion particles, the base includes first, second, and third base refractive indices in the first direction, the second direction and a third direction, respectively, the third direction being substantially perpendicular to the first and second directions, each of the first diffusion particles has first, second, and third particle refractive indices in the first, second and third directions, respectively, and the first and third particle refractive indices are substantially same as the first and third base refractive indices, and the second particle refractive index is different from the second base refractive index.

The base has an isotropic refractive index where the first, second, and third base refractive indices are substantially the same as each other.

The first diffusion particles are randomly distributed in the base.

A distance between the first diffusion particles is in a range from about 1 micrometer to about 1000 micrometers.

Each of the first diffusion particles has a diameter of about 100 nanometers to about 100 micrometers.

The display area of the display panel includes a first area, and the photographic unit and the anisotropic area correspond to the first area of the display area.

The display area of the display panel further includes a second area which does not overlap with the first area, the diffusion plate includes an isotropic area corresponding to the second area of the display panel, in the isotropic area, the diffusion plate includes the base and a plurality of second diffusion particles, and a refractive index of the second diffusion particles defined by the particle refractive indices thereof is different from a refractive index of the first diffusion particles defined by the first, second, and third particle refractive indices.

Each of the second diffusion particles has fourth, fifth and sixth particle refractive indices in the first, second, and third directions, respectively, and the fourth, fifth and sixth particle refractive indices are different from the first, second and third base refractive indices.

The second diffusion particles have an isotropic refractive index where the fourth, fifth and sixth particle refractive indices are substantially the same as each other.

The refractive index of the second diffusion particles is different from the first, second and third base refractive indices in the first, second and third directions.

The backlight unit includes a plurality of light sources which emit the light, a brightness of a light emitted from a first light source among the plurality of light sources is greater than a brightness of a light emitted from a second light source among the plurality of light sources, and the first light source is disposed closer to the first area of the display panel than the second light source.

The backlight unit includes a plurality of light sources which emit the light, a pitch between first light sources among the plurality of light sources is smaller than a pitch between second light sources among the plurality of light sources and the first light sources are disposed closer to the first area of the display area than the second light sources.

The display apparatus further includes a controller which generates a period control signal to define a photographic period and a display period where the photographic period and display period are alternately provided. The backlight unit generates the light during the display period, the display panel operates in a display state during the display period and operates in a transmission state during the photographic period and the photographic unit captures the image of the object only during the photographic period.

In the display state, the display panel operates in response to a gate signal and a data voltage to display the image, and in the transmission state, the display panel transmits the image of the object to the diffusion plate.

The display apparatus further includes a photographic compensation part where the image of the object transmitted to the photographic unit through the display panel is distorted by the display panel. In the display state, the photographic unit captures the distorted image of the object and generates a photographic data on the basis of the distorted image of the object, and the photographic compensation part compensates for the photographic data on the basis of an image data provided to the display panel to generate an un-distorted image of the object.

The display panel further includes a non-display part and a display part, where the display part displays an image and corresponds to a display area of the display panel, the display part includes a first part and a second part, and the photographic unit includes a first sub-photographic unit corresponding to the first part and a second sub-photographic unit corresponding to the second part.

The display apparatus further includes a tracking unit including a viewpoint detection part which detects a viewpoint of a user and a viewpoint determination part which generates a view signal, where the view signal includes a view information about a part of the first and second parts, to which the user views. The first and second sub-photographic units receive the view signal and are operated in response to the view signal.

The first sub-photographic unit captures the image of the object in response to the view signal when the user views the first part, and the second sub-photographic unit captures the image of the object in response to the view signal when the user views the second part.

The display apparatus further includes a $\lambda/4$ wave plate interposed between the first polarizing plate and the diffusion plate.

The display apparatus further includes a reflection polarizing plate interposed between the diffusion plate and the backlight unit, the reflection polarizing plate having a second polarizing axis which is substantially parallel to the second direction and a reflection axis which is substantially parallel to the first direction.

An opening is defined in the reflection polarizing plate to correspond to the photographic unit.

The display apparatus further includes a $\lambda/4$ wave plate interposed between the diffusion plate and the photographic unit.

The display panel further includes a liquid crystal layer and a second polarizing plate facing the first polarizing plate, the liquid crystal layer disposed between the first and second polarizing plates, and the second polarizing plate has a second polarizing axis substantially parallel to the second direction.

According to the above, the display apparatus includes the diffusion plate having the transmission axis substantially parallel to the first polarizing axis of the first polarizing plate and the diffusion axis substantially perpendicular to the first polarizing axis. Therefore, although the photographic unit is provided to correspond to the display area, a dark area may be prevented from occurring in the display area, and thus the photographic unit may take a sharp image of the object.

BRIEF DESCRIPTION OF THE DRAWINGS

The above and other features of the invention will become readily apparent by reference to the following detailed description when considered in conjunction with the accompanying drawings, in which.

DETAILED DESCRIPTION

Figure 1:
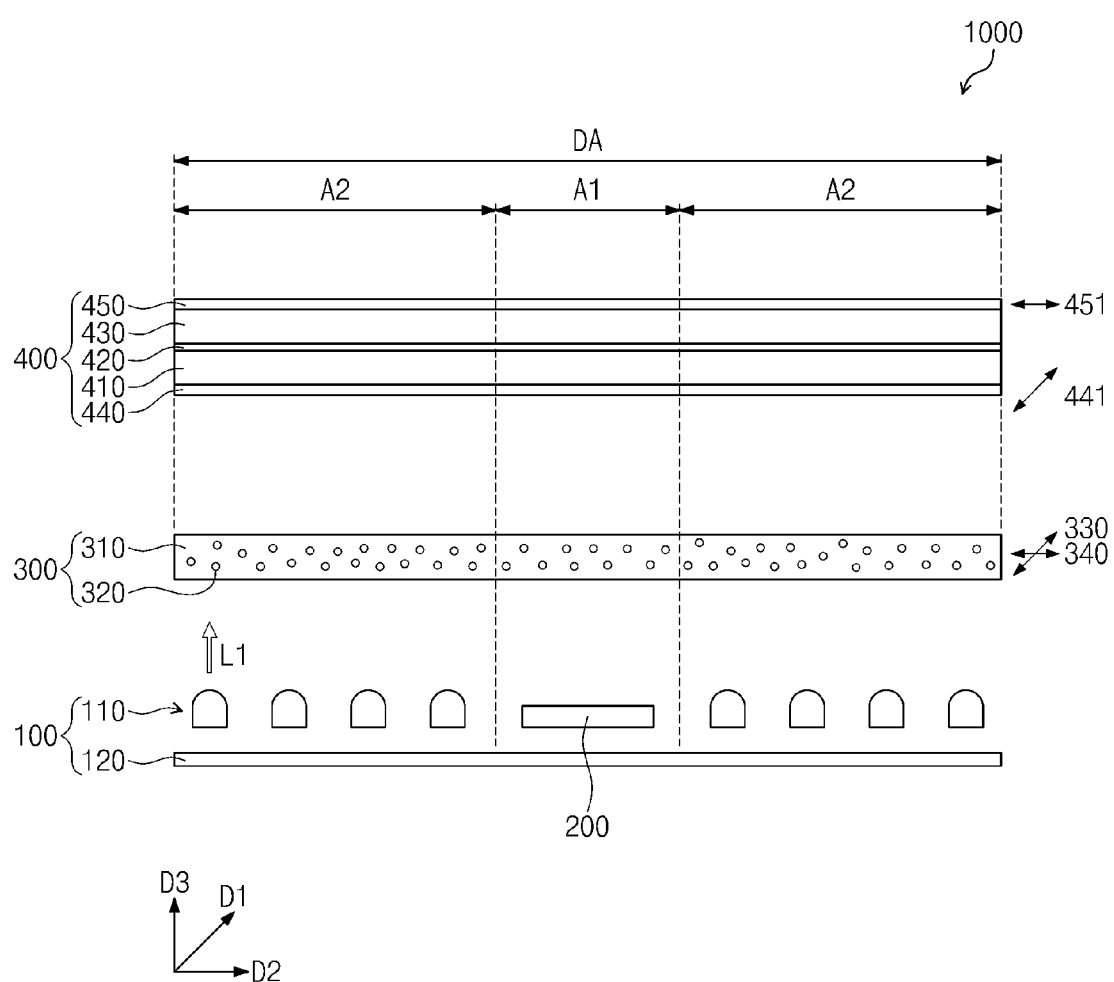
FIG. 1 is a cross-sectional view showing an exemplary embodiment of a display apparatus of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be explained in detail with reference to the accompanying drawings. For drawings in which a three-direction coordinate system is indicated, such system refers to a three-dimensional space (see, for example, FIG. 3) even though a drawing may illustrate a two-dimensional view.

FIG. 1 is a cross-sectional view showing an exemplary embodiment of a display apparatus 1000 according to the invention.

Referring to FIG. 1, the display apparatus 1000 includes a backlight unit 100, a photographic unit 200, a diffusion plate 300 and a display panel 400.

The backlight unit 100 includes a plurality of light sources 110 emitting a light L1 and a reflection plate 120 disposed at a rear side of the light sources 110. In the present exemplary embodiment, the backlight unit 100 is a direct-illumination type backlight unit, but should not be limited thereto or thereby. In an exemplary embodiment, an edge-illumination type backlight unit may be used as the backlight unit 100.

The reflection plate 120 reflects the light leaking downward from the light sources 110 to the diffusion plate 300 to improve the light utilization efficiency of the light L1. In an exemplary embodiment, the reflection plate 120 may include polyethylene terephthalate or poly carbonate, which has a relatively high reflectance.

The light sources 110 emit the light L1 to the diffusion plate 300. The light sources 110 may be, but not limited to, light emitting diodes ("LEDs"). In the present exemplary embodiment, the light sources 110 may be, but not limited to, white LEDs, which emit a white light. The light sources 110 may also be red, green, blue, cyan, magenta and yellow LEDs respectively, which emit red, green, blue, cyan, magenta and yellow light or at least one LED selected from among the red, green, blue, cyan, magenta, and yellow LEDs.

The light sources 110 are mounted on a light source driving board (not shown) in a matrix form. The light source driving board has a substantially bar shape elongated in one direction. In an exemplary embodiment, multiple light source driving boards having the bar shape are provided, and the light sources 110 are arranged on each light source driving board in a single line.

The display panel 400 includes an array substrate 410, an opposite substrate 430 and a liquid crystal layer 420 interposed between the array substrate 410 and the opposite substrate 430. The opposite substrate 430 faces the array substrate 410 while being coupled to the array substrate 410. The display panel 400 includes a first polarizing plate 440 provided on a lower surface of the array substrate 410 and a second polarizing plate 450 provided on an upper surface of the opposite substrate 430.

The display panel 400 includes a display part disposed to correspond to a display area DA and a non-display part disposed to correspond to a non-display area (not shown), where the non-display part is defined adjacent to at least one side of the display area DA. The display part includes pixels PX (refer to FIG. 2) and displays the image through the pixels PX. The non-display part is disposed around the display part. The non-display part includes conductive and/or signal lines and drivers to drive the pixels PX.

The first polarizing plate 440 includes a first polarizing axis 441, which is substantially parallel to a first direction D1. The first polarizing plate 440 transmits only a light polarized in a direction substantially parallel to the first polarizing axis 441 and absorbs or reflects other light polarized in a different direction.

In a three-dimensional space (refer to FIG. 3), the second polarizing plate 450 includes a second polarizing axis 451, which is substantially parallel to a second direction D2 and substantially perpendicular to the first direction D1. The second polarizing plate 450 transmits only a light polarized in a direction substantially parallel to the second polarizing axis 451 among light incident thereto and absorbs or reflects the other light polarized in a different direction.

The first and second polarizing plates 440 and 450 may be formed by, after allowing dichroic iodine or dichroic dye to be adsorbed onto a polyvinyl alcohol resin film, drawing the resin film along the elongation direction.

The photographic unit 200 is interposed between the backlight unit 100 and the diffusion plate 300. The display area DA includes a first area A1 and a second area A2. The second area A2 does not overlap the first area A1. In an exemplary embodiment, the second area A2 surrounds the first area A1.

The photographic unit 200 is disposed to correspond with the first area A1. In an exemplary embodiment, the photographic unit 200 is disposed in the first area A1, which overlaps with the display area DA of the display panel 400 where the image is displayed.

The photographic unit 200 takes a picture of an object in front of the display panel 400. In an exemplary embodiment, the photographic unit 200 is disposed at the rear side of the display panel 400 and the photographic unit 200 takes the image of the object by receiving the image of the object through the display panel 400.

In an exemplary embodiment, the photographic unit 200 is an optical device, e.g., a charge-coupled device ("CCD"), to convert an optical signal to an electrical signal.

In an exemplary embodiment, the diffusion plate 300 is interposed between the photographic unit 200 and the display panel 400 and diffuses the light L1 emitted from the light sources 110 to improve brightness uniformity. The diffusion plate 300 has a substantially plate-like shape corresponding to a shape of the display panel 400.

The diffusion plate 300 includes a base 310 and a plurality of diffusion particles 320. The base 310 includes a transparent polymer resin. In an exemplary embodiment, the base 310 is formed of a transparent polymer resin, e.g., polyethylene terephthalate ("PET"), polyethylene naphthalate ("PEN"), polycarbonate ("PC"), etc., which has a transmittance equal to or greater than about 90% to less than about 100%.

The plurality of diffusion particles 320 are distributed in the base 310. In an exemplary embodiment, an optical diffusion layer (not shown), in which the plurality of diffusion particles 320 are distributed, may be disposed on the base 310. The optical diffusion layer is formed by distributing the plurality of diffusion particles 320 in a resin (not shown) having an adhesive force and coating the resin including the plurality of diffusion particles 320 distributed therein on the base 310. In an exemplary embodiment, the resin includes one or more resins of a silicon resin, an epoxy resin and an acrylic resin. The plurality of diffusion particles 320 includes a polymer resin, such as coPEN of a copolymer of polyethylene naphthalate ("PEN").

The diffusion plate 300 includes a transmission axis 330 and a diffusion axis 340. In an exemplary embodiment, the diffusion plate 300 transmits a light that is polarized in a direction substantially parallel to the transmission axis 330 and diffuses a light that is polarized substantially parallel to a diffusion axis 340. In the present exemplary embodiment, the transmission axis 330 is substantially parallel to the first direction D1 and the diffusion axis 340 is substantially parallel to the second direction D2. The transmission axis 330 and the diffusion axis 340 are determined depending on an overall refractive index of the base 310 and an overall refractive index of the plurality of diffusion particles 320. The diffusion plate 330 will be described in detail later with reference to FIG. 3.

Although not shown in figures, in an exemplary embodiment the display apparatus 1000 may further include an optical sheet disposed between the diffusion plate 300 and the display panel 400. The optical sheet is disposed on the diffusion plate 300 and includes at least one sheet to improve brightness characteristics of the light exiting from the diffusion plate 300. In an exemplary embodiment, the optical sheet may include one diffusion sheet diffusing the light and two prism sheets condensing the light.

In an exemplary embodiment, the optical sheet may be disposed between the diffusion plate 300 and the backlight unit 100 to prevent the image of the object, which is incident to the photographic unit 200, from being distorted due to the optical sheet. In addition, the optical sheet is disposed only to correspond to the first area A1 and not disposed in the second area A2.

Figure 2:
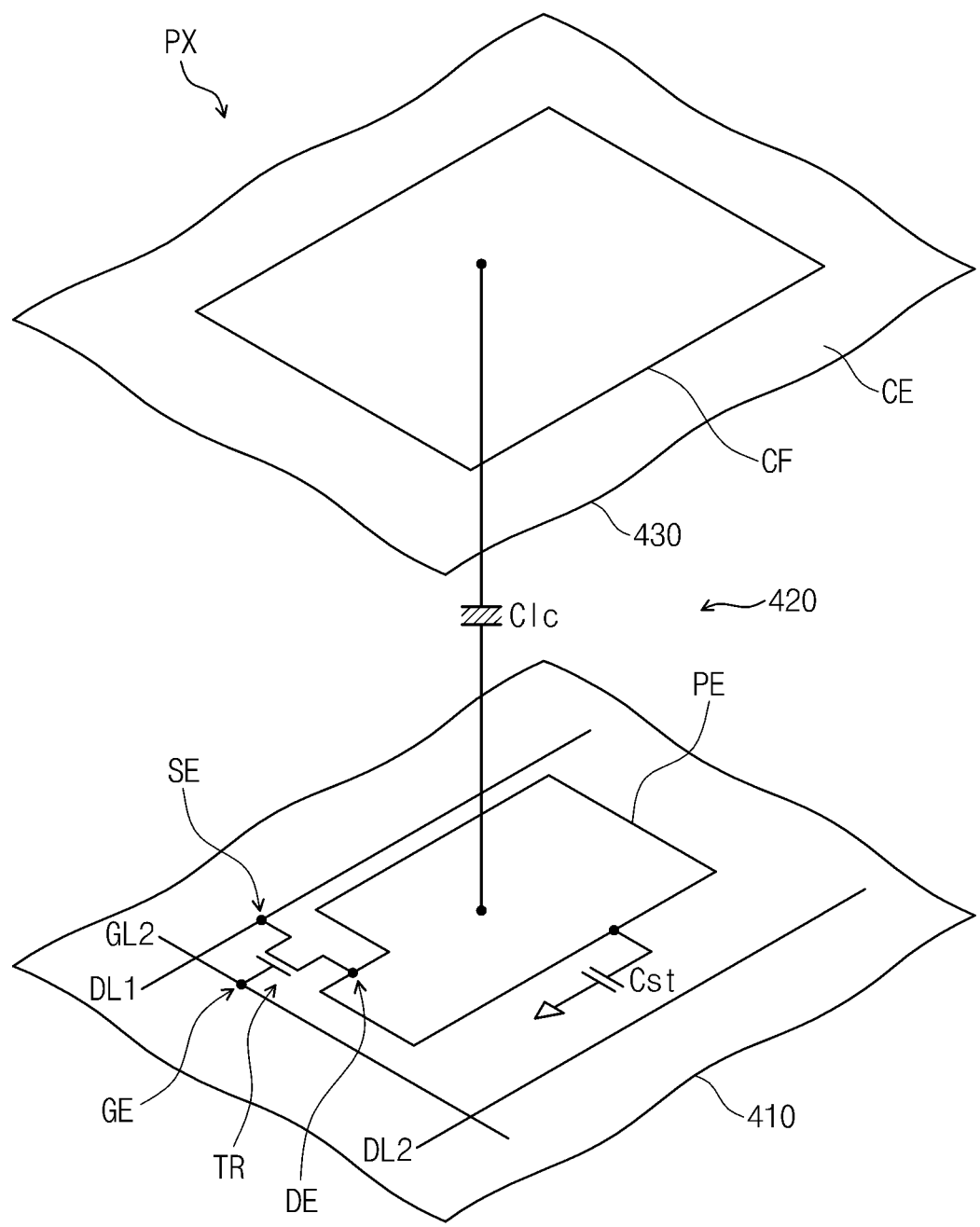
FIG. 2 is an equivalent circuit diagram showing an exemplary embodiment of one pixel shown in FIG. 1.

FIG. 2 is an exemplary embodiment of an equivalent circuit diagram showing one pixel shown in FIG. 1.

For the convenience of explanation, FIG. 2 shows one pixel PX connected to a second gate line GL2 and a first data line DL1 among first and second data lines DL1 and DL2. In the present exemplary embodiment, all of the pixels PX of the display panel 400 shown in FIG. 1 have the same structure and function as the pixel PX shown in FIG. 2, but the invention is not limited thereto.

Referring to FIG. 2, the pixel PX includes a transistor TR connected to the second gate line GL2 and the first data line DL1, a liquid crystal capacitor Clc connected to the transistor TR, and a storage capacitor Cst connected to the liquid crystal capacitor Clc in parallel. In an exemplary embodiment, the storage capacitor Cst may be omitted.

The transistor TR is disposed on the array substrate 410. The transistor TR includes a gate electrode GE connected to the second gate line GL2, a source electrode SE connected to the first data line DL1 and a drain electrode DE connected to the liquid crystal capacitor Clc and the storage capacitor Cst.

The liquid crystal capacitor Clc includes a pixel electrode PE disposed on the array substrate 410, a common electrode CE disposed on the opposite substrate 430, and the liquid crystal layer 420 disposed between the pixel electrode PE and the common electrode CE. In this case, the liquid crystal layer 420 serves as a dielectric substance. The pixel electrode PE is connected to the drain electrode DE of the transistor TR.

In an exemplary embodiment, the common electrode CE may be disposed on an entire surface of the opposite substrate 430, but should not be limited thereto or thereby. The common electrode CE may be disposed on the array substrate 410. In an exemplary embodiment, at least one of the pixel electrode PE and the common electrode CE includes slits.

The storage capacitor Cst includes the pixel electrode PE, a storage electrode (not shown) branched from a storage line (not shown) and an insulating layer disposed between the pixel electrode PE and the storage electrode. The storage line is disposed on the array substrate 410 and formed on the same layer as the second gate line GL2. In an exemplary embodiment, the storage electrode partially overlaps the pixel electrode PE.

In an exemplary embodiment, the pixel PX may further include a color filter CF displaying one of the primary colors. As an example, the color filter CF may be disposed on the opposite substrate 430, but should not be limited thereto or thereby. In an exemplary embodiment, the color filter CF may be disposed on the array substrate 410.

In an exemplary embodiment, the transistor TR is turned on in response to a gate signal provided through the second gate line GL2. The turned-on transistor TR applies a data voltage provided through the first data line DL1 to the pixel electrode PE of the liquid crystal capacitor Clc. The common electrode CE is applied with a common voltage.

Due to the difference in the voltage level between the data voltage and the common voltage, an electric field is formed between the pixel electrode PE and the common electrode CE. Liquid crystal molecules of the liquid crystal layer 420 are driven by the electric field formed between the pixel electrode PE and the common electrode CE. The light transmittance of the liquid crystal layer 420 is controlled by the liquid crystal molecules driven in response to the electric field, and thus displays the desired image.

The storage line (not shown) is applied with a storage voltage having a constant voltage level, but should not be limited thereto or thereby. In an exemplary embodiment, the storage line may receive the common voltage. The storage capacitor Cst maintains the voltage charged in the liquid crystal capacitor Clc.

Figure 3:
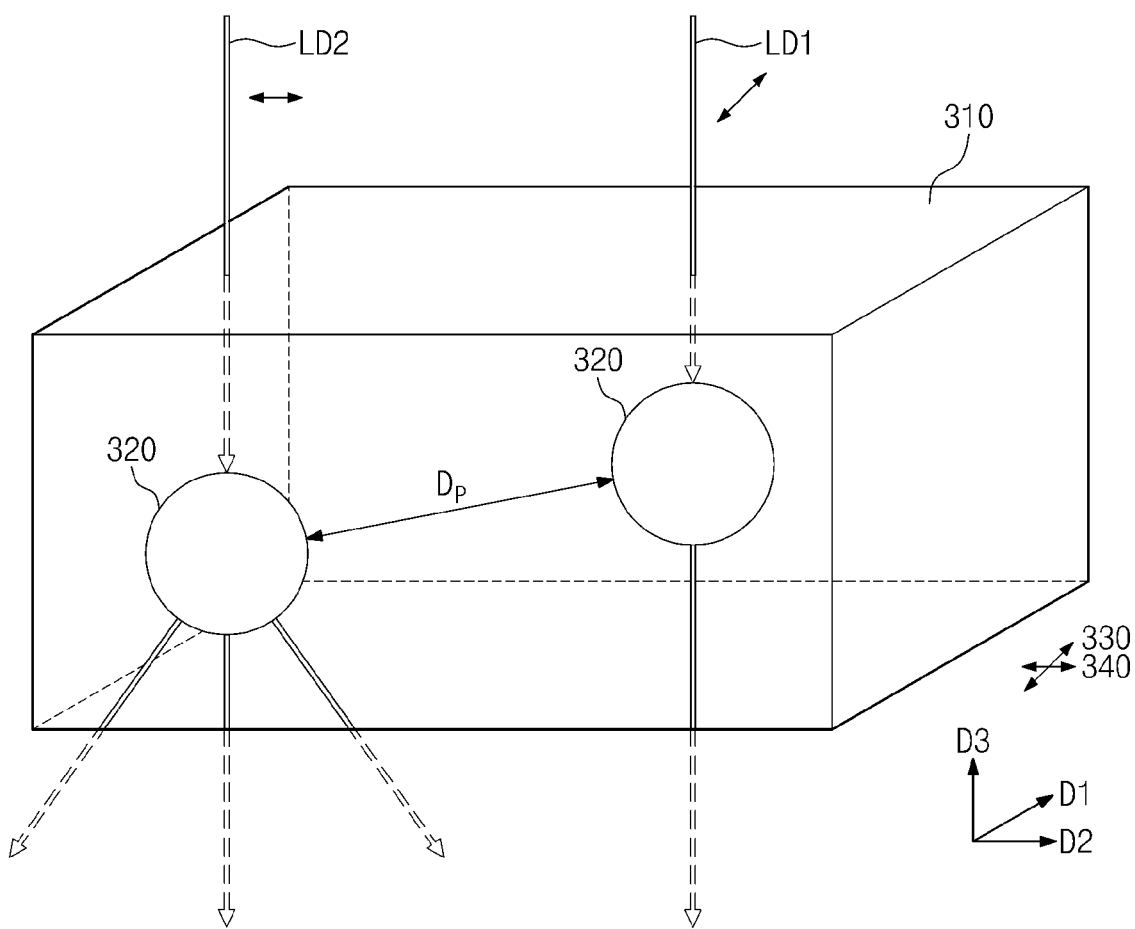
FIG. 3 is an enlarged perspective view showing an exemplary embodiment of a portion of a diffusion plate shown in FIG. 1.

FIG. 3 is an enlarged perspective view showing an exemplary embodiment of a portion of the diffusion plate 300 shown in FIG. 1.

Referring to FIG. 3, in an exemplary embodiment, the base 310 has a first, a second and a third base refractive indices $n_{b1}$, $n_{b2}$ and $n_{b3}$ in the first direction D1, the second direction D2 and a third direction D3, where the third direction D3 is substantially perpendicular to the first and second directions D1 and D2, respectively.

The plurality of diffusion particles 320 have a first, a second and a third particle refractive indices $n_{p1}$, $n_{p2}$ and $n_{p3}$ in the first, second and third directions D1, D2 and D3, respectively. In the present exemplary embodiment, the first particle refractive index $n_{p1}$ is substantially the same as the first base refractive index $n_{b1}$ and the third particle refractive index $n_{p3}$ is substantially the same as the third base refractive index $n_{b3}$. In an exemplary embodiment, the second particle refractive index $n_{p2}$ is different from the second base refractive index $n_{b2}$.

In an exemplary embodiment, the base 310 has an overall isotropic refractive index. Accordingly, the first, second and third base refractive indices $n_{b1}$, $n_{b2}$ and $n_{b3}$ are the same as each other and may be a first refractive index $n_1$. In addition, the plurality of diffusion particles 320 may have an overall anisotropic refractive index. In more detail, the first and third particle refractive indices $n_{p1}$ and $n_{p3}$ may correspond to the first refractive index $n_1$ and the second particle refractive index $n_{p2}$ may correspond to a second refractive index $n_2$, which is different from the first refractive index $n_1$.

The plurality of diffusion particles 320 is randomly distributed in the base 310 to prevent an offset or a constructive interference of the light incident thereto. Each of the diffusion particles 320 is spaced apart from an adjacent diffusion particle thereto by a distance Dp of about 1 micrometer to about 1000 micrometers. In an exemplary embodiment, each of the diffusion particles 320 has a diameter of about 100 nanometers to about 100 micrometers.

When a first polarizing light LD1 is polarized in the first direction D1 and is incident to the diffusion plate 300, the first polarizing light LD1 transmits through the diffusion plate 300 without being refracted or scattered. This is because the first polarizing light LD1 does not transmit through a boundary between the media which causes refraction or scattering when the first base refractive index $n_{b1}$ is substantially the same as the first particle refractive index $n_{p1}$ in the first direction D1.

When a second polarizing light LD2 is polarized in the second direction D2 and is incident to the diffusion plate 300, the second polarizing light LD2 transmits through the diffusion plate 300 after being refracted or scattered. This is because the second polarizing light LD2 transmits through the boundary between the media which causes refraction or scattering, e.g., a boundary between the plurality of diffusion particles 320 and the base 310, while transmitting through the diffusion plate 300 and when the second base refractive index $n_{b2}$ is different from the second particle refractive index $n_{p2}$.

As described above, in an exemplary embodiment, the diffusion plate 300 transmits the light which is polarized substantially parallel to the transmission axis 330 and diffuses the light which is polarized substantially parallel to the diffusion axis 340.

Figure 4:
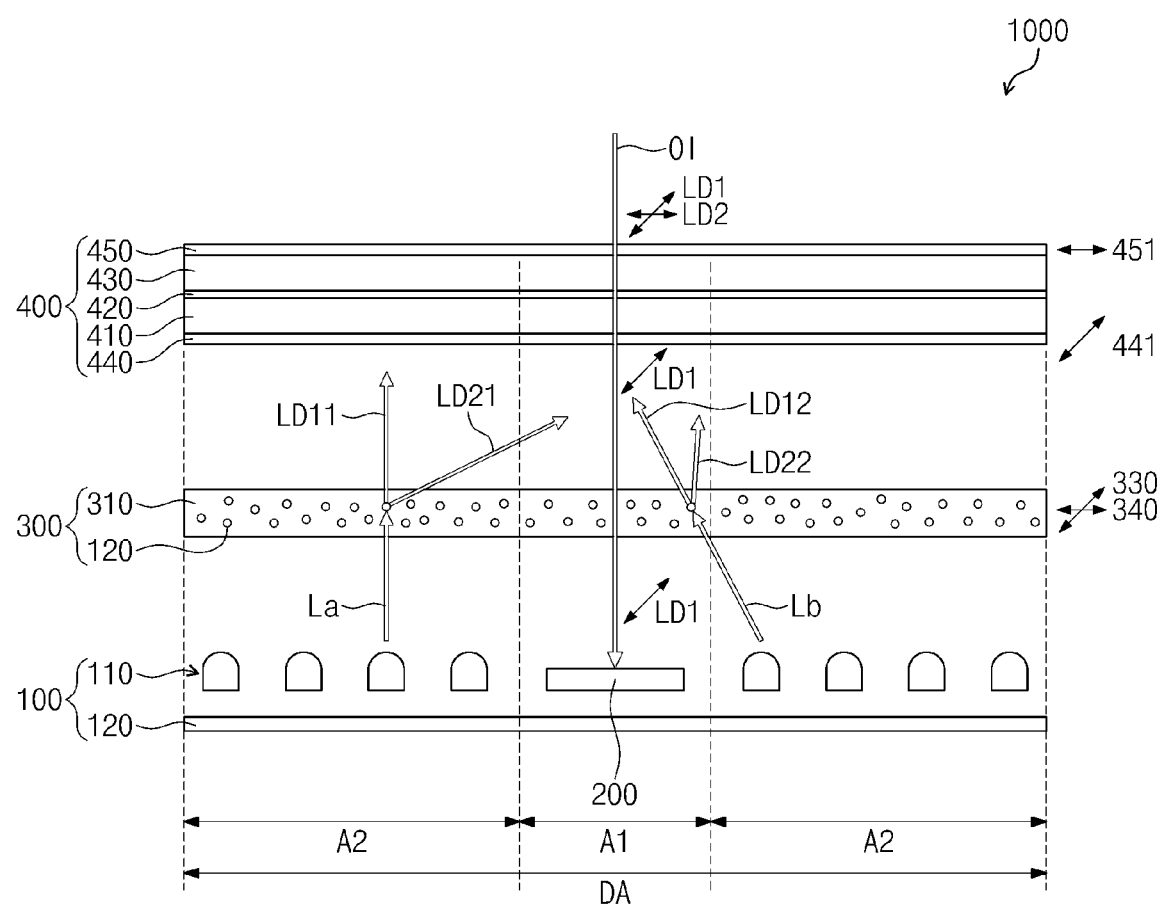
FIG. 4 is a cross-sectional view showing an exemplary embodiment of an operation of the display apparatus shown in FIG. 1.

FIG. 4 is a cross-sectional view showing an exemplary embodiment of an operation of the display apparatus 1000 shown in FIG. 1. In FIG. 4, the operation of the display apparatus 1000 will be described in detail with reference to lights La and Lb traveling specific paths in the light L.

Referring to FIG. 4, the light La is incident to the plurality of diffusion particles 320 and distributed in the second area A2. A first polarizing light LD11 of the light La reaches the display panel 400 corresponding to the second area A2 after being transmitted through the plurality of diffusion particles 320. In addition, the second polarizing light LD21 of the light La reaches the display panel 400 corresponding to the first area A1 after being diffused by the plurality of diffusion particles 320.

In addition, the light Lb is incident to the plurality of diffusion particles 320 and distributed in the first area A1. A first polarizing light LD12 of the light Lb reaches the display panel 400 corresponding to the first area A1 after being transmitted through the plurality of diffusion particles 320. In addition, the second polarizing light LD22 of the light Lb reaches the display panel 400 corresponding to the first area A1 after being diffused by the plurality of diffusion particles 320.

As described above, since the lights La and Lb are diffused not only by the plurality of diffusion particles 320 distributed in the second area A2 but also the plurality of diffusion particles 320 distributed in the first area A1, a dark area may be prevented from occurring due to a difference in brightness between the first and second areas A1 and A2.

In an exemplary embodiment, the image OI of the object includes the first and second polarizing lights LD1 and LD2 before the image OI is incident to the display panel 400. The image OI of the object is polarized in the second direction D2 when it passes through the second polarizing plate 450, and thus the image OI of the object passing through the second polarizing plate 450 includes only the second polarizing light LD2. Then, the polarization of the image OI of the object when it passes through the display panel 400 is changed, and only the light components of the image OI of the object, which is substantially parallel to the first polarizing axis 441, transmits through to the first polarizing plate 440.

Since the image OI of the object reaches the diffusion plate 300 polarized in the first direction D1 and includes only the first polarizing light LD1, the image OI of the object transmits through the diffusion plate 300 without being diffused. Accordingly, the image OI of the object reaches to the photographic unit 200 without being blurred or distorted, and thus the photographic unit 200 may take a sharp image.

In addition, since the transmittance of the display panel 400 is lowered, the photographic unit 200 is prevented from being perceived due to an external light reflected by the photographic unit 200. In an exemplary embodiment, the transmittance of the display panel 400 is about 5%. Therefore, when the external light travels to the second polarizing plate 450 and then sequentially transmits through the second polarizing plate 450, the display panel 400 and the first polarizing plate 440, the intensity of the external light is lowered equal to or smaller than about 5% compared to its original intensity. Further, when the external light sequentially transmits through the first polarizing plate 440, the display panel 400 and the second polarizing plate 450 after being reflected by the photographic unit 200, the intensity of the external light is lowered equal to or smaller than about 0.25% compared to its original intensity. As described above, since the intensity of the external light reflected by the photographic unit 200 is very small, the user watching the display panel 400 does not recognize the photographic unit 200 even though the external light is reflected by the photographic unit 200.

Figure 5:
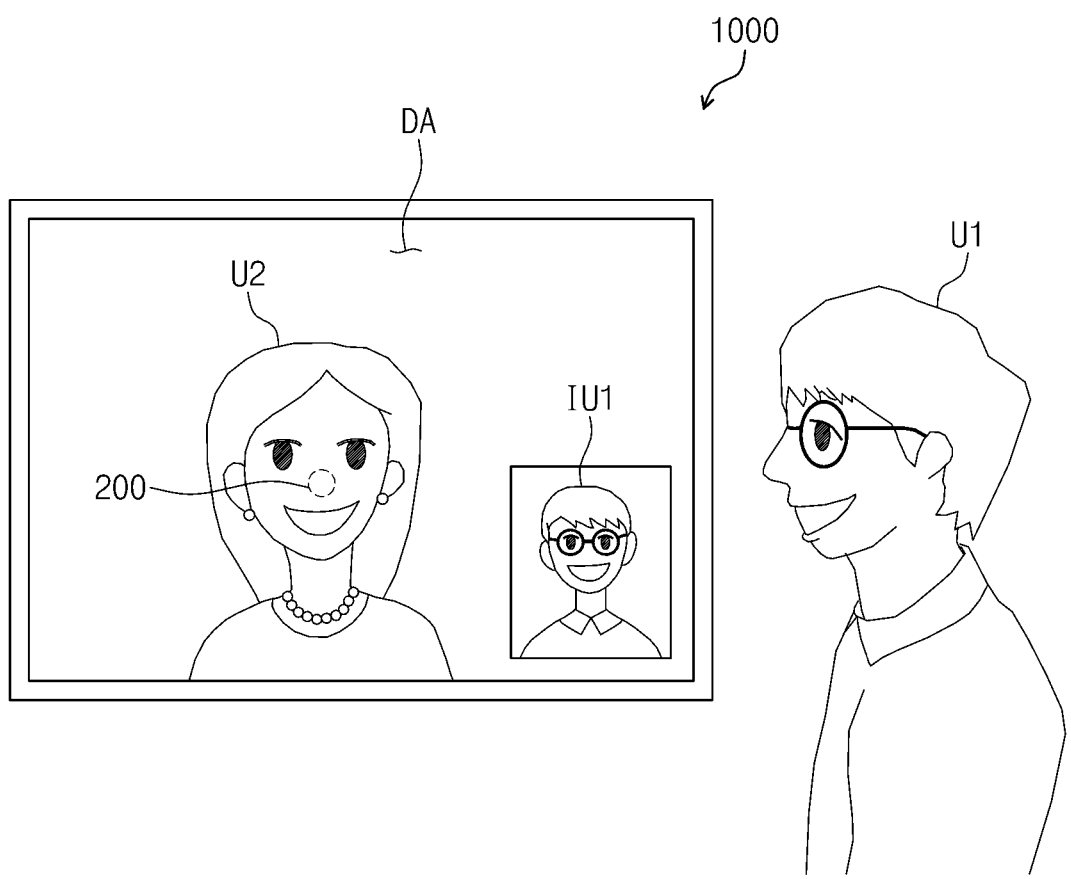
FIG. 5 is a view showing an exemplary embodiment of a user utilizing a display apparatus according to the invention.

FIG. 5 is a view showing an exemplary embodiment of a user utilizing a display apparatus according to the invention.

Referring to FIG. 5, a first user U1 carries out an eye-to-eye communication with a second user U2 through the display apparatus 1000. The first user U1 makes a video telephone call through the photographic unit 200 disposed in the display area DA. The first user U1 watches an image of the second user U2 displayed in the display area DA. When the first user U1 watches the image of the second user U2, the viewpoint of the first user U1 is facing toward the photographic unit 200, and thus the viewpoint of the first user U1 is directed toward a front direction of an image of the first user IU1 taken by the photographic unit 200. Thus, the first and second users U1 and U2 may experience the eye-to-eye communication through the display apparatus 1000.

Figure 6:
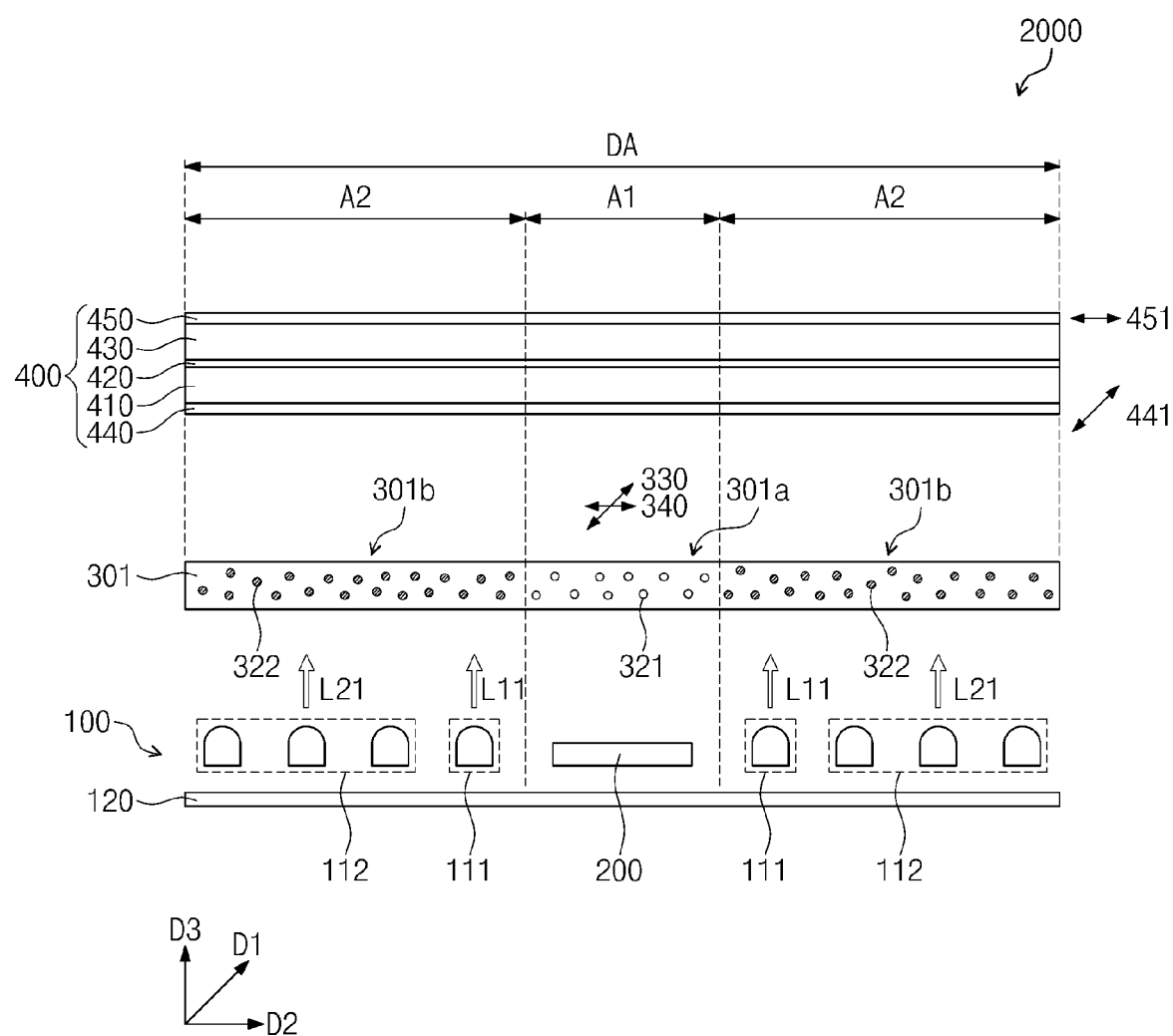
FIG. 6 is a cross-sectional view showing another exemplary embodiment of a display apparatus according to the invention.

FIG. 6 is a cross-sectional view showing another exemplary embodiment of a display apparatus 2000 according to the invention. In FIG. 6, different features of the display apparatus 2000 from those of the display apparatus 1000 shown in FIGS. 1 to 5 will be mainly described.

Referring to FIG. 6, a diffusion plate 301 includes an anisotropic area 301a and an isotropic area 301b. The anisotropic area 301a is disposed to correspond with the first area A1 and the isotropic area 301b is disposed to correspond with the second area A2.

The anisotropic area 301a includes first diffusion particles 321 and the isotropic area 301b includes second diffusion particles 322. The first and second diffusion particles 321 and 322 have different refractive indices from each other.

In an exemplary embodiment, the first diffusion particles 321 may be substantially the same as the plurality of diffusion particles 320 shown in FIG. 3. In more detail, the first diffusion particles 321 have the first, second and third particle refractive indices $n_{p1}$, $n_{p2}$ and $n_{p3}$ in the first, second and third directions D1, D2 and D3, respectively. In an exemplary embodiment, the first and third particle refractive indices $n_{p1}$ and $n_{p3}$ in the first and third directions D1 and D3 of the first diffusion particles 321 are the first refractive index $n_1$ and the second particle refractive index $n_{p2}$ is the second refractive index $n_2$.

The second diffusion particles 322 have the fourth, fifth and sixth particle refractive indices $n_{p4}$, $n_{p5}$ and $n_{p6}$ in the first, second and third directions D1, D2 and D3, respectively. The fourth, fifth and sixth particle refractive indices $n_{p4}$, $n_{p5}$ and $n_{p6}$ are different from the first refractive index $n_1$. In an exemplary embodiment, the second diffusion particles 322 may have the overall isotropic refractive index. In this case, the fourth, fifth and sixth particle refractive indices $n_{p4}$, $n_{p5}$ and $n_{p6}$ are the same each other and correspond to a third refractive index $n_3$.

The anisotropic area 301a includes the transmission axis 330 and the diffusion axis 340, which are determined by the first diffusion particles 321. In an exemplary embodiment, the anisotropic area 301a diffuses only the light polarized substantially parallel to the diffusion axis 340 among the lights L incident thereto. However, the diffusion particles 322 of the isotropic area 301b diffuse the lights polarized in arbitrary directions, and thus the diffusion particles 322 of the isotropic area 301b diffuse all light components of the lights L incident thereto. Therefore, the diffusivity of the isotropic area 301b, which includes the second diffusion particles 322, is greater than the diffusivity of the anisotropic area 301a, which includes the first diffusion particles 321.

As described above, in an exemplary embodiment when the first diffusion particles 321 are provided to correspond with the first area A1 and the second diffusion particles 322 are provided to correspond with the second area A2, the diffusivity of the diffusion plate 300 is improved, and thus the brightness uniformity is improved by the second diffusion particles 322.

Further, the display apparatus 2000 includes a first and a second light source 111 and 112. In an exemplary embodiment, the first light source 111 is disposed more adjacent to the first area A1 than the second light source 112. In other words, the distance between the first light source 111 and the first area A1 is smaller than the distance between the second light source 112 and the first area A1.

In an exemplary embodiment, the brightness of a first light L11 emitted from the first light source 111 is greater than brightness of a second light L21 emitted from the second light source 112.

Since the first and second light sources 111 and 112 are not disposed in the first area A1, the brightness of the image displayed in the first area A1 is lower than the brightness of the image displayed in the second area A2. Accordingly, a darker area may be perceived in the first area A1. However, in an exemplary embodiment, when the brightness of the first light L11 is controlled to be greater than the brightness of the second light L21, the brightness of the image displayed in the first area A1 becomes greater than the brightness of the image displayed in the second area A2 and the dark area in the first area A1 may be prevented.

Figure 7:
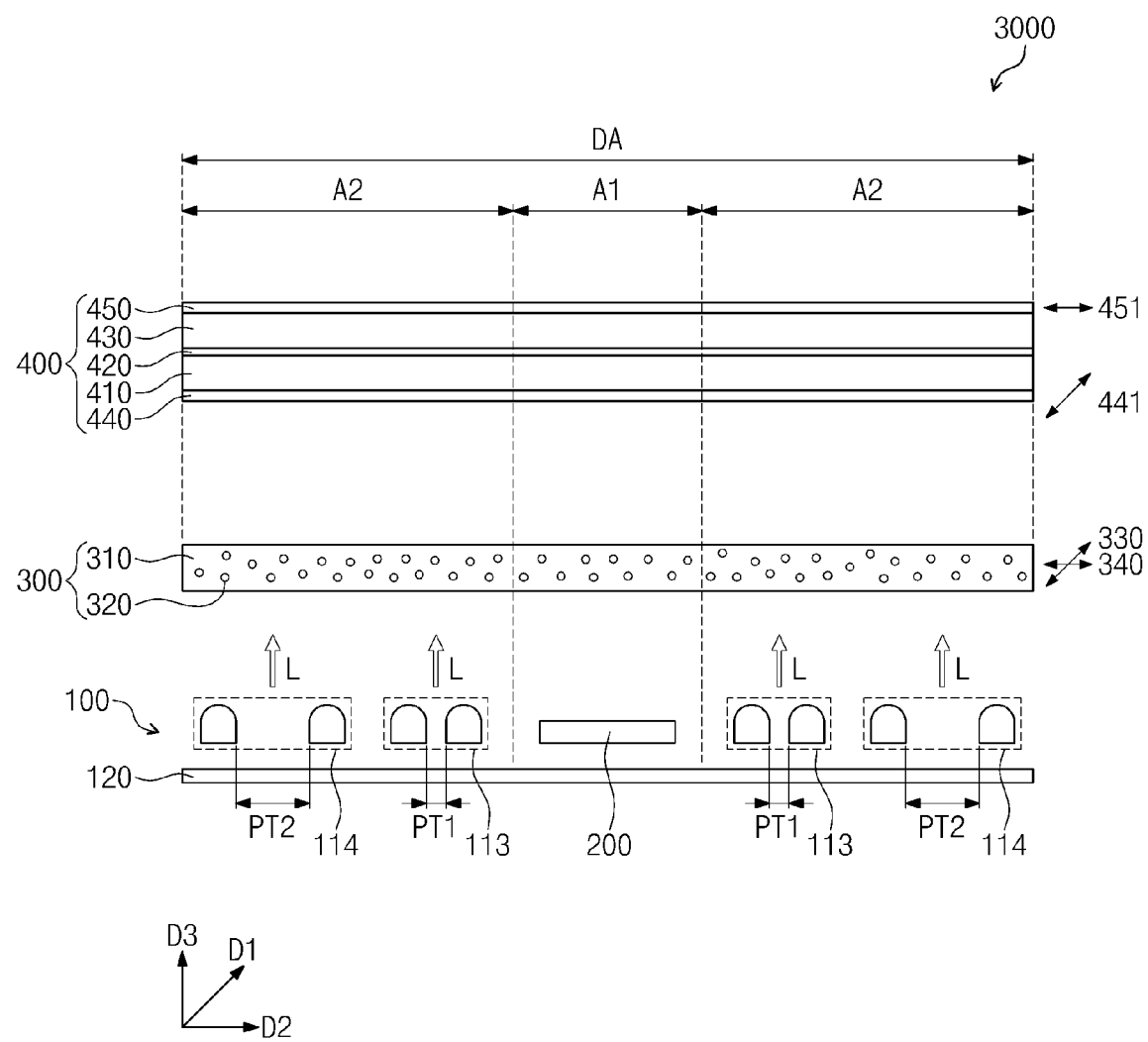
FIG. 7 is a cross-sectional view showing still another exemplary embodiment of a display apparatus according to the invention.

FIG. 7 is a cross-sectional view showing still another exemplary embodiment of a display apparatus according to another exemplary embodiment of the invention.

In FIG. 7, different features of the display apparatus 3000 from those of the display apparatus 1000 shown in FIGS. 1 to 5 will be mainly described.

Referring to FIG. 7, the light sources 110 include a plurality of third light sources 113 and a plurality of fourth light sources 114. In an exemplary embodiment, the third light sources 113 are disposed more adjacent to the first area A1 than the fourth light sources 114. In other words, the distance between the first area A1 and the third light source 113 is smaller than the distance between the first area A1 and the fourth light source 114.

In an exemplary embodiment, a first pitch PT1 between the third light sources 113 is smaller than a second pitch PT2 between the fourth light sources 114. Accordingly, the number of the third light sources 113 per unit area is larger than the number of the fourth light sources 114. In addition, the third and fourth light sources 113 and 114 generate a light L which as a uniform brightness.

As described above, when the first pitch PT1 is smaller than the second pitch PT2, the brightness of the image displayed in the first area A1 becomes greater than the brightness of the image displayed in the second area A2, and thus the dark area generated in the first area A1 may be prevented.

Figure 8:
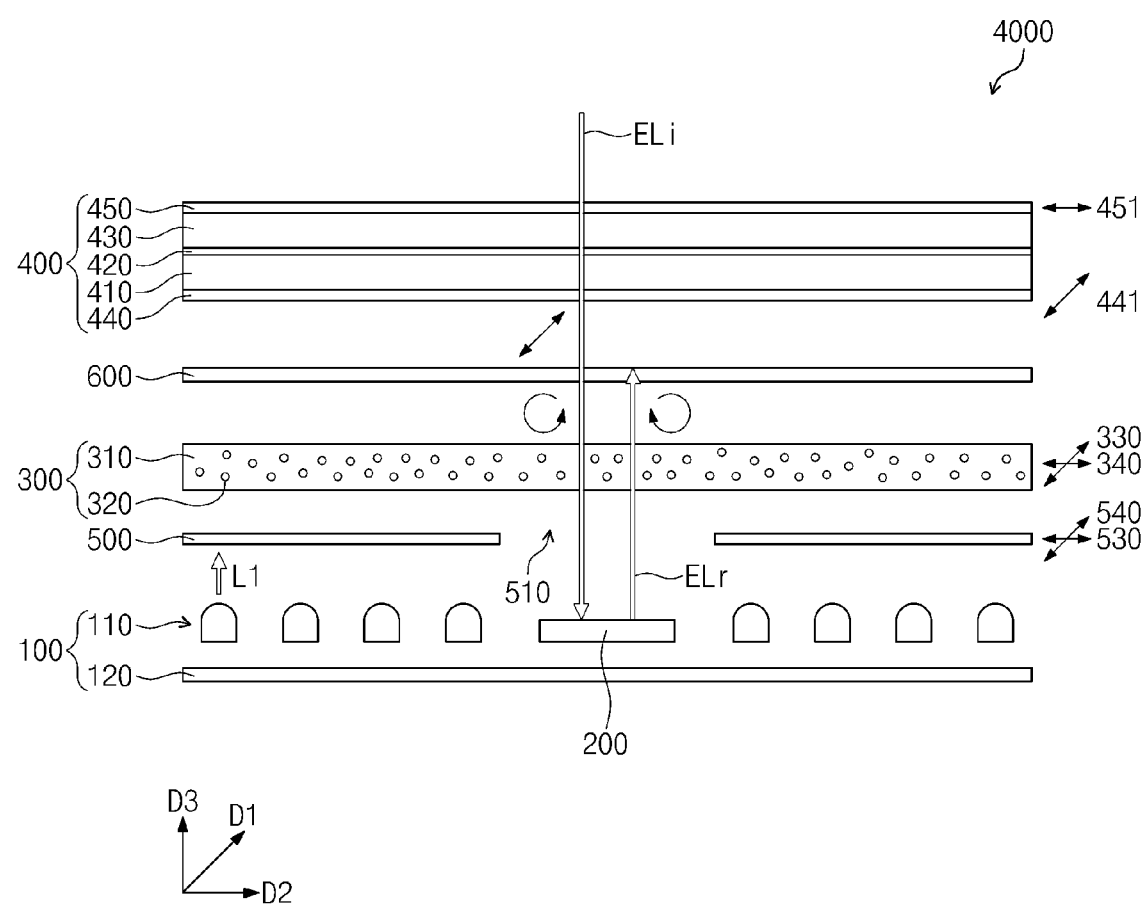
FIG. 8 is a cross-sectional view showing still another exemplary embodiment of a display apparatus according to the invention.

FIG. 8 is a cross-sectional view showing still another exemplary embodiment of a display apparatus according to the invention. In FIG. 8, different features of the display apparatus 4000 from those of the display apparatus 1000 shown in FIGS. 1 to 5 will be mainly described.

The display apparatus 4000 includes a reflection polarizing plate 500 and a $\lambda/4$ wave plate 600.

The reflection polarizing plate 500 is disposed between the diffusion plate 300 and the backlight unit 100. The reflection polarizing plate 500 includes an opening 510 formed therethrough to correspond with the first area A1. The photographic unit 200 is exposed through the opening 510 and receives the image of the object from outside of the display apparatus 4000 and through the opening 510.

The reflection polarizing plate 500 includes a plurality of first optical layers (not shown) and a plurality of second optical layers (not shown). The first optical layers are alternately stacked with the second optical layers. In an exemplary embodiment, the first and second optical layers have different refractive indices in the first direction D1 and have the same refractive index in the second direction D2.

In an exemplary embodiment, the reflection polarizing plate 500 includes a transmission axis 530 which is substantially parallel to the second direction D2 and has a reflection axis 540 substantially parallel to the first direction D1. The reflection polarizing plate 500 receives the light L1, transmits only the light component polarized substantially parallel to the transmission axis 530 of the light L1 and reflects the light components polarized substantially parallel to the reflection axis 540 of the light L1.

In an exemplary embodiment, the light L1 reaches the diffusion plate 300 after transmitting through the reflection polarizing plate 500 and is polarized in the second direction D2, most of the light L1 is diffused by the diffusion plate 300. Therefore, the diffusivity of the diffusion plate 300 is improved and the brightness of the light L1 traveling to the display panel 400 is improved, thereby improving a light utilization efficiency of the light sources 110.

The $\lambda/4$ wave plate 600 is interposed between the display panel 400 and the diffusion plate 300.

In an exemplary embodiment, an input external light ELi passes through the first polarizing plate 440 is linearly polarized in the first direction D1 by the first polarizing plate 440 and circularly polarized while passing through the $\lambda/4$ wave plate 600. Then, the input external light ELi is reflected by the photographic unit 200 and becomes a reflected external light ELr. The reflected external light ELr is circularly polarized in a direction opposite to the direction in which the input external light ELi is circularly polarized. In an exemplary embodiment, when the input external light ELi is right-circularly polarized, the reflected external light ELr is left-circularly polarized. Then, the reflected external light ELr is linearly polarized while passing through the $\lambda/4$ wave plate 600. In this case, since a difference in phase between the input external light ELi and the reflected external light ELr is about $\lambda/2$ on the $\lambda/4$ wave plate 600, the input external light ELi and the reflected external light ELr are offset to each other. As a result, the reflected external light ELr is not perceived through to the display area DA.

As described above, the $\lambda/4$ wave plate 600 prevents the photographic unit 200 from being perceived by the user even though the external light ELr is reflected by the photographic unit 200.

In another exemplary embodiment, instead of being disposed between the diffusion plate 300 and the display panel 400, the $\lambda/4$ wave plate 600 may be disposed between the diffusion plate 300 and the photographic unit 200.

In addition, to reduce the reflectance of the photographic unit 200, an anti-reflection coating layer may be disposed on the surface of the photographic unit 200.

Figure 9:
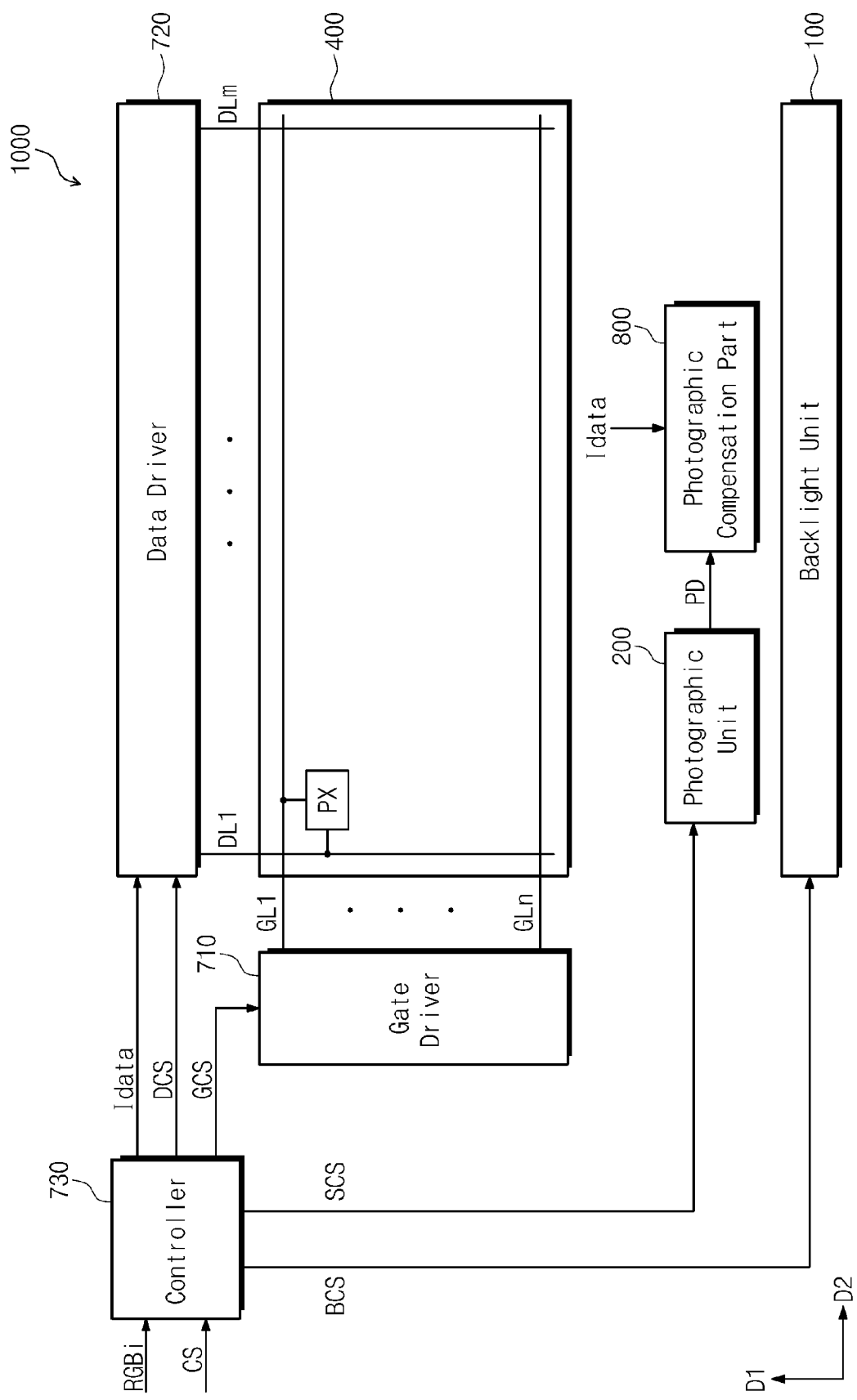
FIG. 9 is a block diagram showing the display apparatus shown in FIG. 1.

FIG. 9 is a block diagram showing the display apparatus 1000 shown in FIG. 1.

Referring to FIG. 9, the display apparatus 1000 includes a gate driver 710 and a data driver 720, which drives the display panel 400, and a controller 730, which controls a drive of the gate driver 710 and the data driver 720.

In an exemplary embodiment, the controller 730 receives input image information RGBi and a plurality of control signals CS from outside of the display apparatus 1000. The controller 730 converts the data format of the input image information RGBi to an appropriate data format in order to interface between the data driver 720 and the controller 730. The image data Idata generated by the controller is applied to the data driver 720.

In addition, the controller 730 generates a data control signal DCS, e.g., an output start signal, a horizontal start signal, etc. on the basis of the control signals CS and a gate control signal GCS, e.g., a perpendicular start signal, a perpendicular clock signal, a perpendicular clock bar signal, etc. The data control signal DCS is applied to the data driver 720 and the gate control signal GCS is applied to the gate driver 710.

The gate driver 710 sequentially outputs gate signals in response to the gate control signal GCS provided from the controller 730.

The data driver 720 converts the image data Idata to data voltages in response to the data control signal DCS provided from the controller 730 and applies the data voltages to the display panel 400.

Each pixel PX of the display panel 400 displays a basic unit image for the image. The resolution of the display panel 400 is determined by the number of the pixels PX arranged on the display panel 400. For the convenience of explanation, FIG. 9 shows one pixel PX.

In an exemplary embodiment, each pixel displays one of the primary colors, red, green, blue and white, but the primary colors should not be limited to red, green, blue and white. That is, the primary colors may further include other various colors, e.g., yellow, cyan, magenta, etc.

The display panel 400 further includes a plurality of gate lines GL1 to GLn and a plurality of data lines DL1 to DLm.

The gate lines GL1 to GLn extend in the second direction D2 and are arranged in the first direction D1 to be substantially parallel to each other. The gate lines GL1 to GLn are connected to the gate driver 710 to sequentially receive the gate signals from the gate driver 710.

The data lines DL1 to DLm extend in the first direction D1 and are arranged in the second direction D2 to be substantially parallel to each other. The data lines DL1 to DLm are connected to the data driver 720 and receive the data voltages from the data driver 720.

Each of the pixels PX is connected to a corresponding gate line of the gate lines GL1 to GLn and a corresponding data line of the data lines DL1 to DLm. In an exemplary embodiment, each pixel PX is turned on or turned off in response to the gate signal applied thereto. The turned-on pixels PX display grayscales corresponding to the data voltages applied thereto.

In an exemplary embodiment, the controller 730 is mounted on a printed circuit board ("PCB") in an integrated circuit chip form and is connected to the gate driver 710 and the data driver 720. The gate driver 710 and the data driver 720 are mounted on a flexible printed circuit board ("FPCB") after being formed in plural driving chips, and then connected to the display panel 400 in a tape carrier package ("TCP") scheme.

In another exemplary embodiment, the gate driver 710 and the data driver 720 may be mounted on the display panel 400 in a chip-on-glass ("COG") scheme after being formed in plural driving chips. In addition, the gate driver 710 may be substantially simultaneously formed with the transistors of the pixels PX and mounted on the display panel 400 in ("ASG") (amorphous silicon thin film transistor ("TFT") gate driver circuit) form.

The controller 730 applies a photographic control signal SCS and a backlight control signal BCS to the photographic unit 200 and the backlight unit 100, respectively, to control the photographic unit 200 and the backlight unit 100.

The photographic unit 200 takes the image of the object in response to the photographic control signal SCS. The photographic unit 200 takes the image of the object and generates photographic data PD.

In an exemplary embodiment, when the photographic unit 200 takes an image of the object while the display panel 400 displays the image, the image of the object taken by the photographic unit 200 reaches the photographic unit 200 after it is transmitted through the display panel 400, and in this case, the image of the object may be distorted by the display panel 400. In more detail, the display panel 400 controls the transmittance of the pixels PX in accordance with the image data Idata and displays the image. Thus, the image of the object, which transmits through the pixels PX of the display panel 400, may be distorted by the transmittance of the pixels PX, which is determined by the image data Idata.

In an exemplary embodiment, the display apparatus 1000 may further include a photographic compensation part 800 to restore the image of the object, which is distorted by the display panel 400. The photographic compensation part 800 receives the photographic data PD and the image data Idata and compensates for the photographic data PD on the basis of the image data Idata, to thereby restore the image OI of the object.

Figure 10:
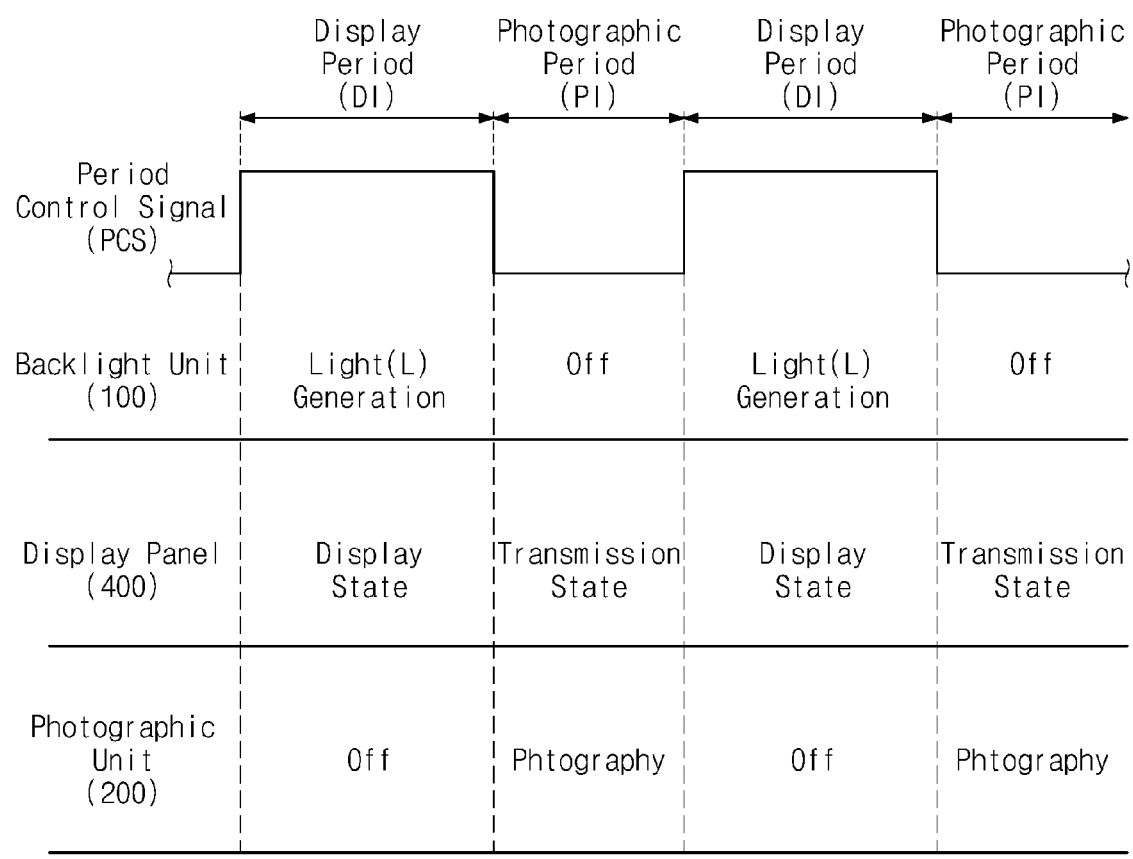
FIG. 10 is a timing diagram showing an exemplary embodiment of an operation of a display apparatus according to the invention.
Figure 11A:
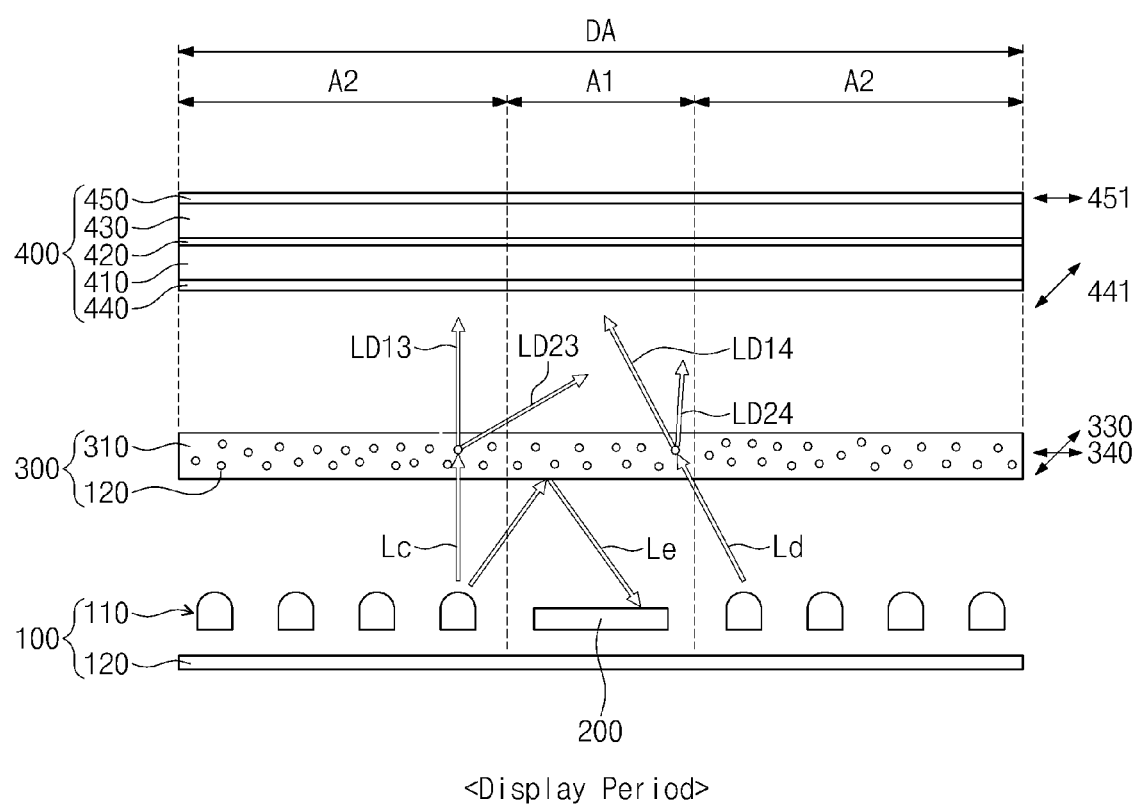
FIG. 11A is a view showing an exemplary embodiment of an operation of a display apparatus during a display period according to the invention.
Figure 11A:
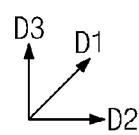
Figure 11B:
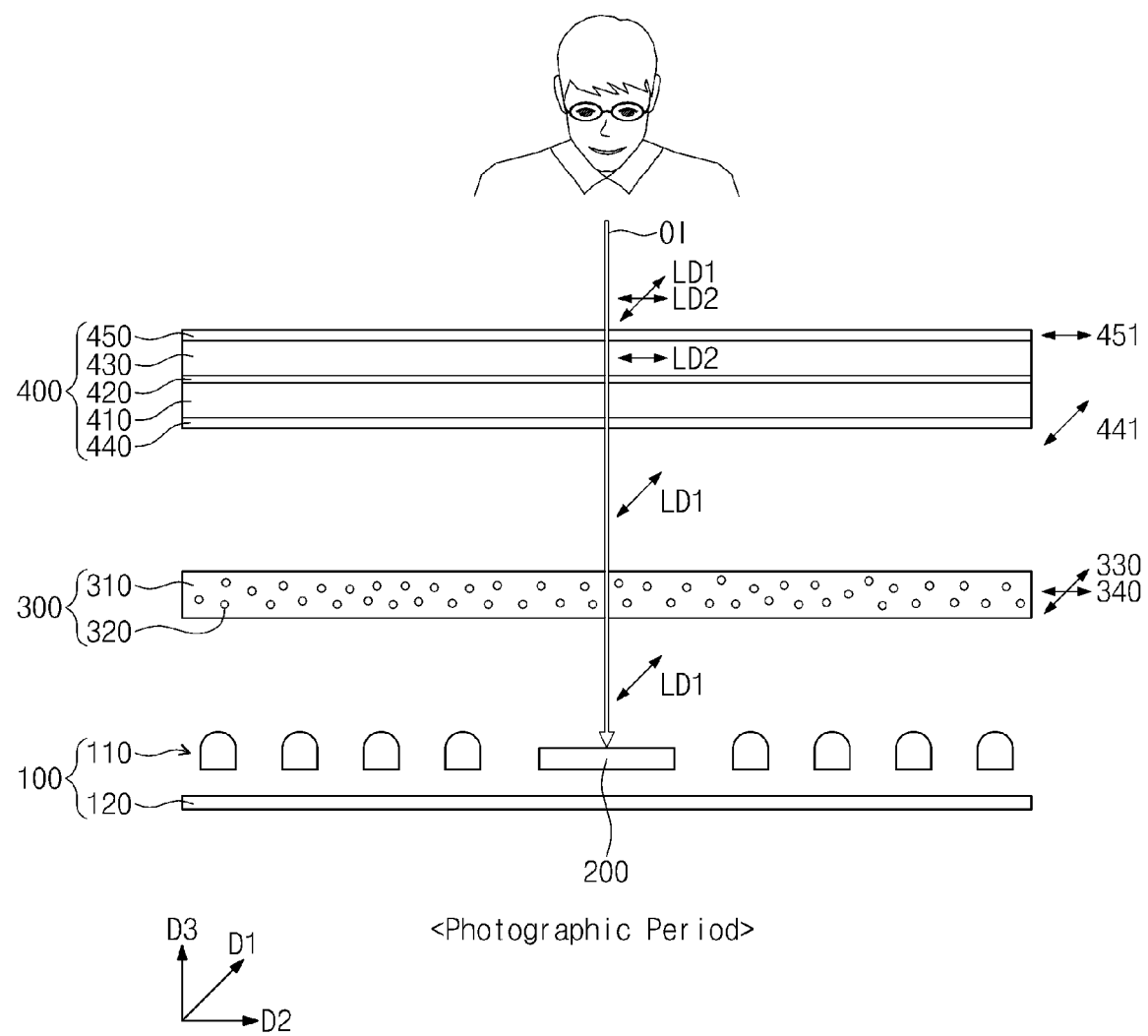
FIG. 11B is a view showing an exemplary embodiment of an operation of a display apparatus during a photographic period according to the invention.

FIG. 10 is a timing diagram showing an exemplary embodiment of an operation of a display apparatus according to the invention, FIG. 11A is a view showing an exemplary embodiment of an operation of a display apparatus during a display period according to the invention, and FIG. 11B is a view showing an exemplary embodiment of an operation of a display apparatus during a photographic period according to the invention.

The display apparatus 1000 described with reference to FIGS. 10, 11A, and 11B does not include the photographic compensation part 800 and has the same structure and function as those of the display apparatus 1000 shown in FIG. 9 except that the display apparatus 1000 shown in FIGS. 10, 11A, and 11B is operated in a time division fashion according to a photographic period PI and a display period DI, which are timely distinct from each other.

Referring to FIG. 10, a period control signal PCS is generated by the controller 730. The period control signal PCS defines the display period DI and the photographic period PI, which alternate with each other. The period control signal PCS has a high level during the display period DI and has a low level during the photographic period PI.

The controller 730 generates the backlight control signal BCS in response to the period control signal PCS and applies the backlight control signal BCS to the backlight unit 100. The backlight unit 100 turns on the light sources 110 and generates light L1 in response to the backlight control signal BCS.

The controller 730 generates the photographic control signal SCS in response to the period control signal PCS and applies the photographic control signal SCS to the photographic unit 200. The photographic unit 200 takes the image of what is disposed in front of the display apparatus 1000 in response to the photographic control signal SCS.

The controller 730 synchronizes the image photographic timing of the photographic unit 200 with the image output timing of the display panel 400 such that when the photographic unit 200 takes the image and when the image is outputted to the display panel 400, the two processes alternate.

In an exemplary embodiment, during the display period DI, the backlight unit 100 generates light L1 and the display panel 400 displays the image using the light L1, but the photographic unit 200 is turned off. In addition, during the photographic period PI, the backlight unit 100 is turned off and no light L1 is generated, and thus the display panel 400 is operated in a transmission state. However, the photographic unit 200 takes the image of what is disposed in front of the display apparatus 1000 during the photographic period PI.

Hereinafter, the operation of an exemplary embodiment of the display apparatus 1000 will be described with reference to lights Lc, Ld, and Le traveling in specific paths among the light L1 in FIG. 11A. As shown in FIG. 11A, the light Lc is incident to the plurality of diffusion particles 320 distributed in the second area A2, a first polarizing light LD13 reaches the display panel 400 corresponding to the second area A2 after passing through the plurality of diffusion particles 320. In addition, a second polarizing light LD23 of the light Lc reaches the display panel 400 corresponding to the first area A1 after being diffused by the plurality of diffusion particles 320.

In addition, the light Ld is incident to the plurality of diffusion particles 320 distributed in the first area A1, a first polarizing light LD14 reaches the display panel 400 corresponding to the first area A1 after passing through the plurality of diffusion particles 320. In addition, a second polarizing light LD24 of the light Ld reaches the display panel 400 corresponding to the first area A1 after being diffused by the plurality of diffusion particles 320.

In an exemplary embodiment, since the lights Lc and Ld are diffused by the plurality of diffusion particles 320 distributed in the second area A2 and by the plurality of diffusion particles 320 distributed in the first area A1, the dark area may be prevented, which is caused by the brightness difference between the first and second areas A1 and A2.

The display panel 400 is operated in a display state during the display period DI. When the display panel 400 is operated in the display state, the display panel 400 receives the data voltage from the data driver 720 and outputs the image corresponding to the image data Idata.

In an exemplary embodiment, the display panel 400 displays the image corresponding to one frame during the display period DI, but should not be limited thereto or thereby. In an exemplary embodiment, the display panel 400 may consecutively display the image corresponding to two or more frames during the display period DI.

The image OI (refer to FIG. 11B) of the object, which is taken by the photographic unit 200, may be distorted by the light Le incident to the photographic unit 200 after being reflected by the diffusion plate 300 or the display panel 400. Accordingly, in an exemplary embodiment, the photographic unit 200 may be turned off in the display period DI to prevent the distortion of the image of the object.

Referring to FIG. 11B, in an exemplary embodiment, during the photographic period PI, the backlight unit 100 is turned off and does not generate light L1.

In addition, the display panel 400 is operated in the transmission state during the photographic period PI. In an exemplary embodiment, when the display panel 400 is operated in the transmission state, the display panel 400 is operated to allow the external light incident to the surface of the display panel 400 to transmit through the display panel 400. For instance, the pixels PX of the display panel 400 are applied with the data voltages corresponding to a white grayscale (255 grayscale). Therefore, when the display panel 400 is operated in the transmission state, the image OI of the object disposed in front of the display panel reaches to the diffusion plate 300 and the photographic unit 200 after transmitting through the display panel 400.

In an exemplary embodiment, the image OI of the object includes the first and second polarizing lights LD1 and LD2 before the image OI is incident to the display panel 400. The image OI of the object is polarized in the second direction D2 while passing through the second polarizing plate 450, and thus the image OI of the object includes only the second polarizing light LD2. Then, since the image OI of the object becomes the first polarizing light LD1 including only the light components polarized substantially parallel to the first direction D1 while passing through the display panel 400 operated in the transmission state, the image OI of the object transmits through the first polarizing plate 440.

Since the image OI of the object reaching the diffusion plate 300 is the first polarizing light LD1, the image OI of the object transmits through the diffusion plate 300 and reaches the photographic unit 200. Accordingly, the photographic unit 200 may take the image OI of the object, which transmits through the display panel 400 and the diffusion plate 300.

As described above, since the photographic unit 200 takes the image when the display panel 400 does not display the image, the image OI of the object, which is taken by the photographic unit 200, may be prevented from being distorting due to the image which is normally displayed by the display panel 400 or the lights L.

In addition, since the image OI of the object is polarized in the first direction D1 which is substantially parallel to the transmission axis 330 and incident to the diffusion plate 300, the image OI of the object transmits through the diffusion plate 300 without being diffused. Thus, the image OI of the object reaches the photographic unit 200 without being blurred or distorted, and thus the photographic unit 200 may take a sharp image.

In an exemplary embodiment, when the display apparatus 1000 including the diffusion plate 300 is operated in the time division fashion having a display period DI and a photographic period PI, the display apparatus 1000 may display the image having a constant brightness and may take a sharp image of the object disposed in front of the display apparatus 1000 using the photographic unit 200 provided corresponding to the display area DA (refer to FIG. 11A). As a result, the photographic unit 200 may take a sharp image.

Figure 12:
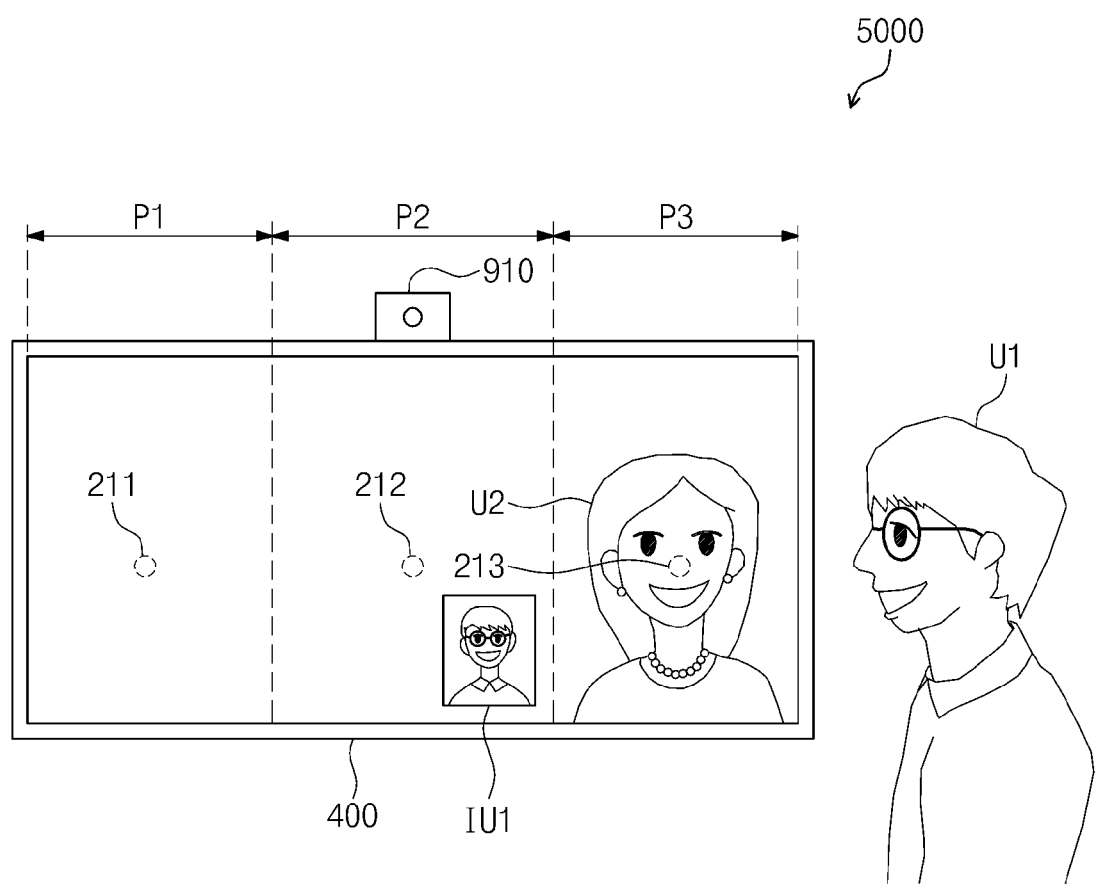
FIG. 12 is a view showing another exemplary embodiment of a user utilizing the display apparatus shown in FIG. 13.
Figure 13:
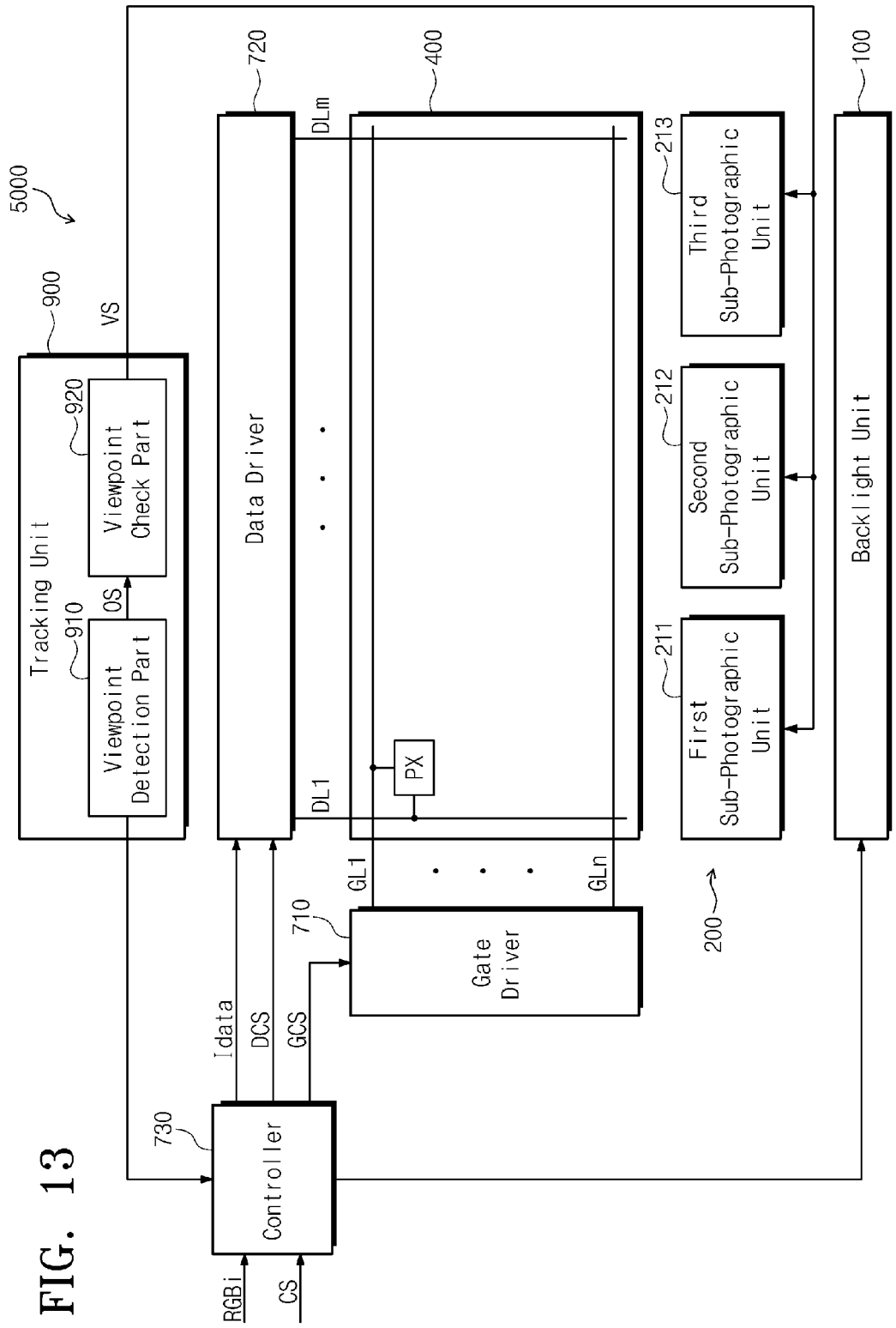
FIG. 13 is a block diagram showing another exemplary embodiment of a display apparatus according to the invention.

FIG. 12 is another exemplary embodiment of a view showing a user utilizing the display apparatus 5000 shown in FIG. 13 and FIG. 13 is another exemplary embodiment of a block diagram showing a display apparatus 5000 according to the invention.

Referring to FIGS. 12 and 13, the display apparatus 5000 have the same structure and function as those of the display apparatus 1000 shown in FIG. 9 except that the display apparatus 5000 further includes a tracking unit 900 and the photographic unit 200 includes a first, a second and a third sub-photographic unit 211, 212 and 213.

As shown in FIG. 12, the display part of the display panel 400 includes a first, a second and a third part P1, P2 and P3. The first, second and third parts P1, P2 and P3 respectively correspond to parts obtained by dividing the display part along a horizontal direction. In this case, the first, second and third sub-photographic units 211, 212 and 213 are respectively disposed at center portions of the first, second and third parts P1, P2 and P3.

However in an exemplary embodiment, the photographic unit 200 should not be limited to the above-mentioned structure. For instance, the photographic unit 200 may include four or more sub-photographic units arranged on the display part in a matrix form.

As shown in FIG. 13, the tracking unit 900 includes a viewpoint detection part 910 and a viewpoint determination part 920.

The viewpoint detection part 910 detects the viewpoint of the first user U1. The viewpoint detection part 910 generates a viewpoint signal OS having information about the detected viewpoint. The viewpoint signal OS includes information about a position of eyes of the first user U1, a position of the viewpoint of the first user U1, and/or a direction of the viewpoint of the first user U1.

In an exemplary embodiment, a facial modeling technology may be used to realize the viewpoint detection part 910. Facial modeling technology is a kind of analyzing process that processes a facial image obtained by a photographic unit and converts the facial image to digital information, which is to be transmitted. The facial modeling technology is comprised of an active shape modeling ("ASM") technology and an active appearance modeling ("AAM") technology. In addition, the viewpoint detection part 910 may check movement of eyeball using identified eyeball's images. The viewpoint detection part 910 detects a direction to which the user gazes using the movement of the eyeball and compares the direction to which the user gazes to information about the display panel 400, which is predetermined, to check an area to which the user gazes.

The viewpoint determination part 920 receives the viewpoint signal OS and checks the viewpoint of the first user U1 in response to the viewpoint signal OS to generate a view signal VS. The view signal VS includes information about the part (hereinafter, referring to as a view part) among the first, second and third parts P1, P2 and P3, to which the first user U1 views.

The first, second and third sub-photographic units 211, 212 and 213 receive the view signal VS and are operated in accordance with the viewpoint information of the view signal VS. In an exemplary embodiment, the first sub-photographic unit 211 takes a picture of the first user U1 in response to the view signal VS when the first user U1 views the first part P1. In this case, the second and third sub-photographic units 212 and 213 do not take a picture of the first user U1.

Similarly, when the second sub-photographic unit 212 takes the picture of the first user U1 in response to the view signal VS when the first user U1 views the second part P2. In this case, the first and third sub-photographic units 211 and 213 do not take a picture of the first user U1.

In addition, when the third sub-photographic unit 213 takes the picture of the first user U1 in response to the view signal VS when the first user U1 views the third part P3. In this case, the second and third sub-photographic units 212 and 213 do not take a picture of the first user U1.

For instance, when the first user U1 views the image of the second user U2 displayed in the third part P3, the third sub-photographic unit 213 takes the image of the first user U1. The first user U1 may view the image of the second user U2 displayed in the display area DA. When the first user U1 views the image of the second user U2, an image of the first user IU1 faces the front direction of the first user U1, which is taken by the third sub-photographic unit 213, since the viewpoint of the first user U1 faces the photographic unit 200.

Accordingly, the first and second users U1 and U2 may experience the eye-to-eye communication through the display apparatus 5000.

In an exemplary embodiment, when the display apparatus 5000 has a large size, the viewpoint of the first user U1 may be changed depending on the area of the image displayed in the display apparatus 5000, to which the first user U1 views.

As described above, in an exemplary embodiment, when the display panel 400 includes the first, second and third sub-photographic units 211, 212 and 213 and the first, second and third sub-photographic units 211, 212 and 213 are operated in accordance with the viewpoint of the first user U1, the first user U1 carries out the eye-to-eye communication while viewing the image displayed on the display apparatus 5000.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:
1. A display apparatus comprising:
a display panel comprising a first polarizing plate having a first polarizing axis substantially parallel to a first direction;
a backlight unit which generates a light;
a diffusion plate interposed between the first polarizing plate and the backlight unit, the diffusion plate comprising an anisotropic area having a transmission axis substantially parallel to the first direction and a diffusion axis substantially parallel to a second direction, wherein the second direction is substantially perpendicular to the first direction; and
a photographic unit interposed between the anisotropic area and the backlight unit, wherein the photographic unit captures an image of an object transmitted to the photographic unit through the display panel,
wherein the anisotropic area comprises a base,
the base comprises first, second, and third base refractive indices in the first direction, the second direction and a third direction, respectively, the third direction being substantially perpendicular to the first and second directions,
each of the first diffusion particles has first, second, and third particle refractive indices in the first, second and third directions, respectively, and
the first and third particle refractive indices are substantially same as the first and third base refractive indices, and the second particle refractive index is different from the second base refractive index.

2. The display apparatus of claim 1, wherein
the first polarizing plate polarizes the image of the object in a direction substantially parallel to the transmission axis to transmit image light polarized in the direction substantially parallel to the transmission axis, and
the diffusion plate:
receives and transmits the image of the object polarized by the first polarizing plate,
provides the photographic unit with the transmitted polarized image of the object,
diffuses a light polarized in a direction substantially parallel to the diffusion axis among the light provided from the backlight unit, and
provides the display panel with the diffused light polarized in the direction substantially parallel to the diffusion axis.

3. The display apparatus of claim 2, wherein
the display panel further comprises a non-display part, and a display part which displays an image, the display part corresponding to a display area of the display panel, and
the photographic unit is disposed to correspond to the display area of the display panel.

4. The touch sensitive system according to claim 1, wherein each distributed control device comprises a processing unit and a computer readable storage medium.

5. The display apparatus of claim 4, wherein the first diffusion particles are randomly distributed in the base.

6. The display apparatus of claim 5, wherein a distance between the first diffusion particles is in a range from about 1 micrometer to about 1000 micrometers.

7. The display apparatus of claim 6, wherein each of the first diffusion particles has a diameter of about 100 nanometers to about 100 micrometers.

8. The display apparatus of claim 1, wherein
the display area of the display panel comprises a first area, and
the photographic unit and the anisotropic area correspond to the first area of the display area.

9. The display apparatus of claim 8, wherein
the display area of the display panel further comprises a second area which does not overlap with the first area,
the diffusion plate comprises an isotropic area corresponding to the second area of the display area,
in the isotropic area, the diffusion plate comprises the base and a plurality of second diffusion particles, and
a refractive index of the second diffusion particles defined by particle refractive indices thereof is different from a refractive index of the first diffusion particles defined by the first, second, and third particle refractive indices thereof.

10. The display apparatus of claim 9, wherein
each of the second diffusion particles has fourth, fifth and sixth particle refractive indices in the first, second and third directions, respectively, and the fourth, fifth and sixth particle refractive indices are different from the first, second and third base refractive indices.

11. The display apparatus of claim 10, wherein the second diffusion particles have an isotropic refractive index where the fourth, fifth and sixth particle refractive indices are substantially the same as each other.

12. The display apparatus of claim 9, wherein the refractive index of the second diffusion particles is different from the first, second, and third base refractive indices in the first, second and third directions.

13. The display apparatus of claim 9, wherein
the backlight unit comprises a plurality of light sources which emit the light,
a brightness of a light emitted from a first light source among the plurality of light sources is greater than a brightness of a light emitted from a second light source among the plurality of light sources, and
the first light source is disposed closer to the first area of the display area than the second light source.

14. The display apparatus of claim 9, wherein
the backlight unit comprises a plurality of light sources which emit the light,
a pitch between first light sources among the plurality of light sources is smaller than a pitch between second light sources among the plurality of light sources, and
the first light sources are disposed closer to the first area of the display area than the second light sources.

15. The display apparatus of claim 1, further comprising a controller which generates a period control signal to define a photographic period and a display period which are alternately provided,
wherein
the backlight unit generates the light during the display period,
the display panel operates in a display state during the display period and operates in a transmission state during the photographic period, and
the photographic unit captures the image of the object only during the photographic period.

16. The display apparatus of claim 15, wherein
in the display state, the display panel operates in response to a gate signal and a data voltage to display the image, and
in the transmission state, the display panel transmits the image of the object to the diffusion plate.

17. The display apparatus of claim 1, further comprising a photographic compensation part,
wherein
the image of the object transmitted to the photographic unit through the display panel is distorted by the display panel,
in the display state, the photographic unit captures the distorted image of the object and generates a photographic data on the basis of the distorted image of the object, and
the photographic compensation part compensates for the photographic data on the basis of an image data provided to the display panel to generate an un-distorted image of the object.

18. The display apparatus of claim 1, wherein the display panel further comprises a non-display part and a display part,
wherein
the display part displays an image and corresponds to a display area of the display panel,
the display part comprises a first part and a second part, and
the photographic unit comprises a first sub-photographic unit corresponding to the first part and a second sub-photographic unit corresponding to the second part.

19. The display apparatus of claim 18, further comprising a tracking unit comprising a viewpoint detection part which detects a viewpoint of a user and a viewpoint determination part which generates a view signal,
wherein
the view signal comprises a view information about a part of the first and second parts, to which the user views, and
the first and second sub-photographic units receive the view signal and are operated in response to the view signal.

20. The display apparatus of claim 19, wherein the first sub-photographic unit captures the image of the object in response to the view signal when the user views the first part, and the second sub-photographic unit captures the image of the object in response to the view signal when the user views the second part.

21. The display apparatus of claim 1, further comprising a $\lambda/4$ wave plate interposed between the first polarizing plate and the diffusion plate.

22. The display apparatus of claim 21, further comprising a reflection polarizing plate interposed between the diffusion plate and the backlight unit, the reflection polarizing plate having a second polarizing axis which is substantially parallel to the second direction and a reflection axis which is substantially parallel to the first direction.

23. The display apparatus of claim 22, wherein an opening is defined in the reflection polarizing plate to correspond to the photographic unit.

24. The display apparatus of claim 1, further comprising a $\lambda/4$ wave plate interposed between the diffusion plate and the photographic unit.

25. The display apparatus of claim 1, wherein
the display panel further comprises a liquid crystal layer and a second polarizing plate facing the first polarizing plate, the liquid crystal layer disposed between the first and second polarizing plates, and
the second polarizing plate has a second polarizing axis substantially parallel to the second direction.

* * * * *